US010896373B1

(12) United States Patent
Forstot et al.

(10) Patent No.: US 10,896,373 B1
(45) **Date of Patent: *Jan. 19, 2021**

(54) DETERMINING COMPREHENSIBILITY OF A GRAPHICAL MODEL IN A GRAPHICAL MODELING ENVIRONMENT

(71) Applicant: The MathWorks, Inc., Natick, MA (US)

(72) Inventors: Dave Aaron Forstot, Waban, MA (US); Gregory Thomas Wolff, Brighton, MA (US); Jeffrey Paul Chapple, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 489 days.

This patent is subject to a terminal disclaimer.

(21) Appl. No.: 14/064,681

(22) Filed: Oct. 28, 2013

Related U.S. Application Data

(63) Continuation of application No. 12/964,277, filed on Dec. 9, 2010, now Pat. No. 8,572,504.

(51) Int. Cl.
*G06N 5/02* (2006.01)

(52) U.S. Cl.
CPC .................................... *G06N 5/02* (2013.01)

(58) Field of Classification Search
CPC ...................................................... G06N 5/02
See application file for complete search history.

(56) References Cited

U.S. PATENT DOCUMENTS 5,572,731 A 11/1996 Morel et al.
5,754,831 A 5/1998 Berman
6,421,667 B1 7/2002 Codd et al.
7,613,589 B2 11/2009 Hosagrahara
7,734,474 B2 6/2010 Ranganathan
8,014,607 B2 9/2011 Saund et al.
8,081,227 B1 * 12/2011 Kim .................. H04N 5/23293 348/211.3
2004/0090439 A1 5/2004 Dillner
2005/0028138 A1 * 2/2005 Case ........................ G06F 8/34 717/113
2006/0143057 A1 6/2006 Sadiq
2008/0313596 A1 * 12/2008 Kreamer .................. G06F 8/20 717/101

OTHER PUBLICATIONS

Hosagrahara, Arvind, “The Modeling Metric Tool Users Guide,” The MathWorks, 9 pages, (2004).
Hosagrahara, Arvind et al., “Measuring Productivity and Quality in Model-Based Design,” The MathWorks, 5 pages (2004).
International Search Report for Application No. PCT/US06/29128, 1 page, dated Mar. 18, 2008.

* cited by examiner

*Primary Examiner* — Stella Higgs
(74) *Attorney, Agent, or Firm* — Kacvinsky Daisak Bluni PLLC

(57) ABSTRACT

In an embodiment, degree of comprehensibility of a graphical representation of a model is identified. The model is provided in a graphical modeling environment. The degree of comprehensibility of the graphical representation of model is identified based at least in part on one or more visual characteristics of one or more elements in the model. The one or more elements in the model include at least one of entities in the model, or relationships in the model. The degree of comprehensibility assigned to the model is communicated, for example, to a user.

30 Claims, 16 Drawing Sheets

600

Total Score: 13
* Abstract: 4
* Concrete: 9

652

Constant
Goto
{A}
[A]
From
Data Store Write
Data Store Memory
Data Store Read
Scope
Goto Tag Visibility

600

600

700

DETERMINING COMPREHENSIBILITY OF A GRAPHICAL MODEL IN A GRAPHICAL MODELING ENVIRONMENT

RELATED APPLICATIONS

The present application is a continuation of U.S. patent application Ser. No. 12/964,277, filed Dec. 9, 2010, entitled "Determining Comprehensibility of a Graphical Model in a Graphical Modeling Environment," the disclosure of which is incorporated by reference herein in its entirety.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
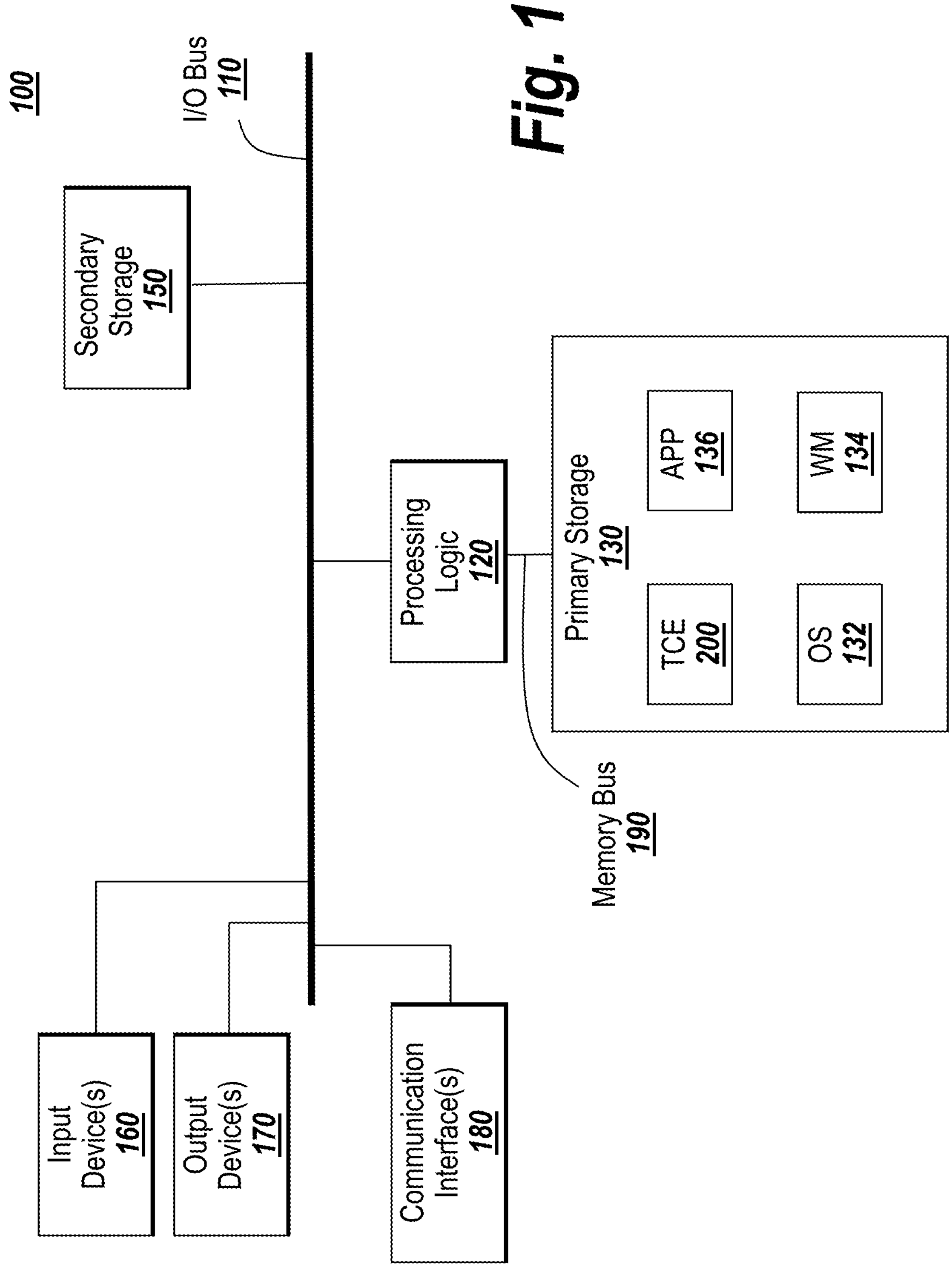
FIG. 1 illustrates a block diagram of an example of a computing device that may be used with one or more embodiments of the invention.
Figure 2:
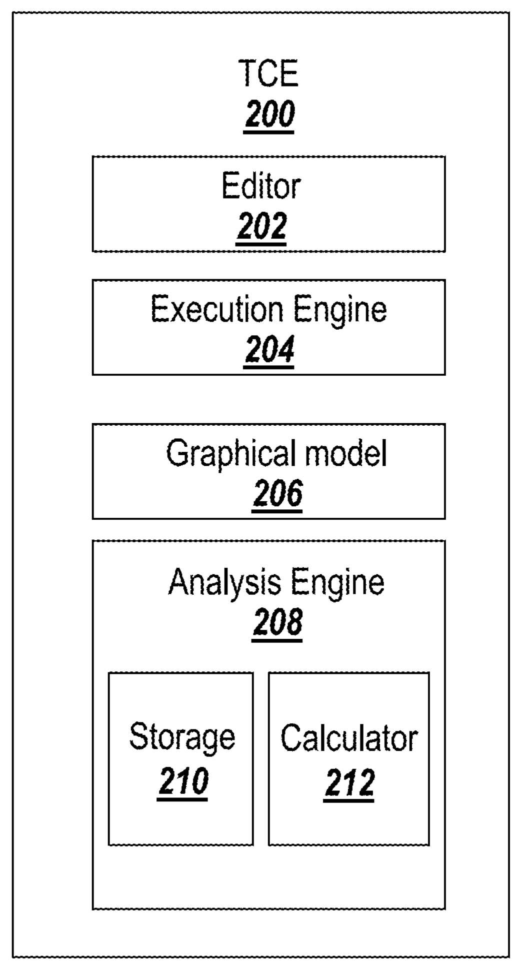
FIG. 2 illustrates a block diagram of an example of a technical computing environment (TCE) that may implement one or more embodiments of the present invention.

The following detailed description refers to the accompanying drawings. The same reference numbers in different drawings may identify the same or similar features illustrated in the drawings.

A graphical model may represent a system, such as a physical dynamic system. A graphical model may be executed in a time domain, an event domain, or a combination thereof. The graphical model may represent part of a dynamic system that may be executed in a time domain, an event domain, or a combination thereof. Here, a domain may define a set of execution semantics that may be enforced during an execution of the graphical model or the dynamic system provided in that domain.

A graphical model may represent a simple system. Here, the graphical model may be easy to understand, work with and collaborate on. Other graphical models may represent complex systems. When a complexity of a graphical model increases, the graphical model may become, for example, prone to errors, harder to maintain and work with, harder to understand, and harder to share among designers.

A complexity of a graphical model may be quantified by assigning a degree of comprehensibility to the graphical model. The degree of comprehensibility may be associated with an ergonomic complexity of the graphical model. The ergonomic complexity may include, for example, a visual complexity and/or a modeling complexity of the graphical model. The degree of comprehensibility may convey, for example, a combination of a degree of the visual complexity and a degree of modeling complexity of the graphical model. In addition, the degree of comprehensibility of the graphical model may represent an amount of information that an observer of the graphical model may have to maintain.

A degree of comprehensibility of a graphical model may be related to a syntactic complexity of the graphical representation of the model. The syntactic complexity may include a concrete component (concrete complexity) and an abstract component (abstract complexity). The concrete complexity may represent a visual complexity created by a presence of certain graphical elements (e.g., certain types of blocks) and the presentation of connections associated with the graphical elements (e.g., line bends, line crossings) in the graphical model. The abstract complexity may incorporate modeling complexity that may be a result of various relationships that may be contained in the graphical model. For example, the abstract complexity may include functionality associated with special or complex graphical elements contained in the graphical model. The abstract complexity may also include the relation that a line between two special or complex elements may represent. The abstract complexity may also include the relation between two special or complex elements that is not visually represented on the graphical model. The special or complex elements may include, e.g. multiplexor blocks, demultiplexor blocks, data store read blocks, data store write blocks, data store memory blocks, non-local goto blocks, non-local from blocks, merge blocks, function-call subsystems (including enabled subsystems and triggered subsystems), sequential logic blocks, graphical functions, state crossings, and/or wormholes The syntactical complexity a graphical model may be determined using various metrics and/or cost functions. For example, a concrete complexity of a graphical model may be determined based on a presence of certain graphical elements in the graphical model. The graphical elements may include blocks and lines contained in the graphical model. The lines may be used to establish relationships between blocks in the graphical model.

For example, a graphical model may include a plurality of blocks that are connected by various lines. A syntactical complexity may be based on, for example, how many blocks and/or lines are used in the graphical model, how many crossing of lines occur in the graphical model, and/or how many bends of lines occur in the graphical model.

An abstract complexity of a graphical model may be determined based on, for example, a presence of special or complex graphical elements in the graphical model. The degree of complexity of a graphical element may be based on the functionality or the data structure associated with the graphical element. For example, abstract complexity may reflect a number of multiplexor blocks, demultiplexor blocks, data store read blocks, data store write blocks, data store memory blocks, non-local goto blocks, non-local from blocks, merge blocks, function-call subsystems, sequential logic blocks, graphical functions, state crossings, and/or wormholes, that are present in the graphical model. A graphical model that may include one or more of these elements may require a viewer of the graphical model to look beyond the graphical model to determine, for example, inputs and/or outputs of some or all these elements, an execution order of some or all these elements or a temporal relationship between some or all these elements. Accordingly, the presence of one or more of special or complex graphical elements in a graphical model may increase the abstract complexity of the graphical model, and consequently the overall comprehensibility of the graphical model.

The abstract complexity of the graphical model may also be associated with the options selected for the graphical elements. For example, the system may determine whether the data scope of a data store memory block is restricted to a hierarchical level, a sub hierarchy, or whether the data scope is global.

Note that techniques for determining a concrete and/or abstract complexity of a graphical model are provided herein for illustrative purposes only and should not be construed as limiting. Alternative techniques may be used for determining a concrete and/or abstract complexity of a graphical model. Also note that metrics may be used to determine a concrete and/or abstract complexity of a graphical model may be stored separately from the graphical model and/or graphical modeling environment used to present (e.g., display) the graphical model. Moreover, the metrics may be associated with various versions of the graphical model. For example, different metrics and/or different versions of metrics may be associated with different versions of the graphical model.

One or more embodiments of the invention may be implemented on one or more computing devices. The one or more computing devices may be a system or part of a system. The one or more computing devices may include, for example, a desktop computer, laptop computer, client computer, server computer, mainframe computer, personal digital assistant (PDA), netbook computer, tablet computer, web-enabled cellular telephone, smart phone, or some other computing device.

FIG. 1 illustrates an example of a computing device 100 that may be used with one or more embodiments of the invention. Referring to FIG. 1, the computing device 100 may include one or more components, such as processing logic 120, primary storage 130, secondary storage 150, one or more input devices 160, one or more output devices 170, and one or more communication interfaces 180, coupled together by one or more buses, such as input-output (I/O) bus 110 and memory bus 190. Note that computing device 100 is an example of a computing device that may implement one or more embodiments of the invention.

The I/O bus 110 may be an interconnect bus that enables communication between various components in the computing device 100, such as processing logic 120, secondary storage 150, input devices 160, output devices 170, and communication interfaces 180. The communication may include, among other things, transferring information (e.g., data, control information, executable instructions) between the components.

The memory bus 190 may be an interconnect bus that may enable information to be transferred between the processing logic 120 and the primary storage 130. The information may include instructions and/or data that may be executed, manipulated, and/or otherwise processed by processing logic 120. The instructions and/or data may include instructions and/or data that may implement one or more embodiments of the invention.

The processing logic 120 may include logic that may interpret, execute, and/or otherwise process information contained in, for example, the primary storage 130 and/or secondary storage 150. The information may include computer-executable instructions and/or data that may implement one or more embodiments of the invention. The processing logic 120 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processing logic 120 may comprise a single core or multiple cores. Moreover, processing logic 120 may comprise a system-on-chip (SoC) or system-in-package (SiP). An example of a processor that may be used to implement processing logic 120 is the Intel® Xeon® processor available from Intel Corporation, Santa Clara, Calif.

The secondary storage 150 may include a non-transitory tangible computer-readable storage media that is accessible to the processing logic 120 via I/O bus 110. The secondary storage 150 may store information for the processing logic 120. The information may be executed, interpreted, manipulated, and/or otherwise processed by the processing logic 120. The secondary storage 150 may comprise, for example, a storage device, such as a magnetic disk, optical disk, random-access memory (RAM) disk, and/or flash drive. The information may be stored on one or more non-transitory tangible computer-readable media contained in the storage device. This media may include, for example, magnetic discs, optical discs, and/or memory devices (e.g., flash memory devices, static RAM (SRAM) devices, dynamic RAM (DRAM) devices, or other memory devices). The information may include data and/or computer-executable instructions that may implement one or more embodiments of the invention.

Input devices 160 may include one or more devices that may be used to input information into computing device 100. Devices that may be used to input information into computing device 100 may include, for example, a keyboard (e.g., hardware keyboard, software keyboard), computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, eyeball controlled device, finger mouse, light pen, light gun, eye tracking device, gesture tracking device, steering wheel, yoke, jog dial, space ball, directional pad, dance pad, soap mouse, haptic device, tactile device, neural device, multi-point input device, discrete pointing device, or some other input device. The information may include spatial (e.g., continuous, multi-dimensional) data that may be input into computing device 100, for example, using a device such as a computer mouse. The information may also include other forms of data, such as, for example, text that may be input using a keyboard.

Output devices 170 may include one or more devices that may output information from the computing device 100. Devices that may output information from the computing device 100 may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, neural stimulation device, printer (e.g., a three-dimensional (3D) printer, laser printer), speaker, video projector, volumetric display device, plotter, actuator (e.g., electrical motor) or some other output device. Output devices 170 may be directed by, for example, the processing logic 120, to output the information from the computing device 100. The information may be presented (e.g., displayed, printed) by output devices 170. The information may include, for example, graphical user interface (GUI) elements (e.g., windows, widgets, dialog boxes, or other GUI elements), graphical representations, pictures, text, or other information that may be presented by output devices 170. Note that the information may be presented on one or more output devices 170 in a stereoscopic view to enable, for example, a perception of depth.

Communication interfaces 180 may include one or more devices that contain logic configured to (1) interface the computing device 100 with, for example, one or more communication networks and (2) enable the computing device 100 to communicate with one or more devices connected to the communication networks. An example of a communication network that may incorporate computing device 100 will be described further below with respect to FIG. 8.

Communication interfaces 180 may include one or more transceiver-like mechanisms that enable the computing device 100 to communicate with devices connected to the communication networks. Communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, or other device suitable for interfacing the computing device 100 to the communication networks.

The primary storage 130 is accessible to the processing logic 120 via bus 190. The primary storage 130 may be a non-transitory tangible computer-readable media that may store information for processing logic 120. The information may include computer-executable instructions and/or data that may implement operating system (OS) 132, windows manager (WM) 134, an application 136 (APP), and a technical computing environment (TCE) 200. The instructions may be executed, interpreted, and/or otherwise processed by processing logic 120.

The primary storage 130 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

OS 132 may be a conventional operating system that may implement various conventional operating system functions. These functions may include, for example, scheduling one or more portions of APP 136 and/or TCE 200 to run on the processing logic 120, managing the primary storage 130, controlling access to various components associated with the computing device 100 (e.g., secondary storage 150, input devices 160, output devices 170, communication interfaces 180), and controlling access to data received and/or transmitted by these components. The OS 132 may execute directly on hardware or in a virtual machine.

A virtual machine may be provided to handle a process running on multiple processors so that the process may appear to be using only one computing resource rather than multiple computing resources. Virtualization may be employed in the computing device 100 so that infrastructure and resources in the computing device may be shared dynamically.

Examples of operating systems that may be used to implement OS 132 include, but are not limited to, the Linux operating system, Microsoft Windows operating system, the Symbian operating system, Mac OS, Chrome OS, and the Android operating system. A version of the Linux operating system that may be used is Red Hat Linux available from Red Hat Corporation, Raleigh, N.C. Versions of the Microsoft Windows operating system that may be used include Microsoft Windows 7, Microsoft Windows Vista, and Microsoft Windows XP operating systems available from Microsoft Inc., Redmond, Wash. The Chrome OS and Android operating systems are available from Google, Inc., Mountain View, Calif. The Mac OS operating system is available from Apple Inc., Cupertino, Calif. The Symbian operating system is available from the Symbian Foundation, London, United Kingdom.

WM 134 may be a conventional window manager that may manage GUI elements, such as widgets, dialog boxes, and windows, that may be part of the OS 132, TCE 200, and APP 136. The GUI elements may be displayed on an output device 170. The WM 134 may also be configured to (1) capture one or more positions of interactions with input devices 160 and/or other data associated with the input devices 160, and (2) provide the positions and/or data to, for example, OS 132, APP 136, and/or TCE 200. The positions and/or data may be provided in messages that are sent to the OS 132, APP 136, and/or TCE 200. Examples of window managers that may be used to implement WM 134 may include, but are not limited to, X windows, GNOME, and KDE, which are often used with the Linux operating system, and window managers used with the Microsoft Windows XP, Microsoft Windows Vista, and Microsoft Windows 7 operating systems. It should be noted that other window managers or components that implement various functions associated with window managers may be used to implement WM 134.

APP 136 may be designed to perform a particular task or tasks. APP 136 may be an executable and/or interpretable version of a software application that may be written in a programming language, such as C, C++, or some other programming language. Some or all of APP 136 may be written by a user of computing device 100, supplied by a vendor, or generated by TCE 200. Some or all of APP 136 may operate under the control of OS 132. APP 136 may include computer-executable instructions and/or data that may implement one or more embodiments of the invention.

TCE 200 may be a modeling environment, such as a graphical modeling environment or textual modeling environment, that may enable modeling of various systems, such as, for example, mechanical systems, electrical systems, and/or electro-mechanical systems. TCE 200 may include tools to build and simulate graphical models that represent one or more systems. The graphical models may comprise one or more elements (e.g., blocks) that may represent various entities associated with the systems.

TCE 200 may automatically generate two dimensional (2-D) visualization of a graphical model. The visualization may be animated during simulation to enable visualization of dynamics associated with the systems represented by the graphical model. TCE 200 may also contain provisions for generating code (e.g., C code or HDL code), for example, use of accelerator modes during simulation. Also, TCE 200 may contain provisions for generating layout and/or manufacturing information (e.g., machining data, STEP-NC code) based on a system's design. Some or all of TCE 200 may operate under the control of OS 132. TCE 200 may include computer-executable instructions and/or data that may implement one or more embodiments of the invention. TCE 200 may comprise various components, which may include an editor 202, an execution engine 204, a graphical model 206 and an analysis engine 208.

TCE 200 may include hardware-based and/or software-based logic, which may provide a computing environment that may allow various tasks, related to various disciplines, such as mathematics, science, engineering, mechanics, physics, medicine, business, biology, and/or finance, to be performed. TCE 200 may include a dynamically-typed programming language (e.g., the MATLAB® language), where a data type of data may be determined at runtime.

The dynamically typed programming language may use an array as a basic data element where the array may not require dimensioning. The array may be used to support array-based programming where an operation may apply to an entire set of values included in the array. Array-based programming may allow array-based operations to be treated as a high-level programming technique that may allow, for example, operations to be performed on entire aggregations of data without having to resort to explicit loops of individual non-array operations.

In addition, the TCE 200 may perform matrix and/or vector formulations that may be used for data analysis, data visualization, application development, simulation, modeling, and/or algorithm development. These matrix and/or vector formulations may be used in many areas, such as mathematics, science, engineering, mechanics, physics, medicine, business, biology, and/or finance.

The TCE 200 may further provide functions and/or tools for generating, for example, plots, surfaces, images, volumetric representations, or other representations. The TCE 200 may provide these functions and/or tools using toolboxes (e.g., toolboxes for signal processing, image processing, data plotting, and/or parallel processing). In addition, the TCE 200 may provide these functions as block sets. The TCE 200 may also provide these functions in other ways, such as via a library or a database.

TCE 200 may contain computer-executable instructions and data that may perform various tasks, such as, for example, (1) constructing graphical model 206 through an interface, such as a GUI and/or a text-based interface; (2) allowing an augmentation of a pre-defined set of elements contained in graphical model 206 with custom user-specified elements; (3) using graphical model 206 to simulate the system represented by graphical model 206; and (4) automatically producing, for example, deployable software systems, and/or descriptions of hardware systems that may mimic a behavior of either the entire graphical model 206 or portions of graphical model 206. These deployable software systems and/or descriptions of hardware systems may allow the system to be simulated in, for example, a distributed computing environment.

Examples of TCEs that may be adapted to implement one or more embodiments of the invention may include, but are not limited to, Simulink®, Stateflow®, Simscape™, SimMechanics™, and SimEvents®, which are available from MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; Advanced Design System, VEE Pro, and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; Working Model 2D from Design Simulation Technologies, Inc.; Working Model from Design Simulation Technologies, Inc.; Computer Aided Three-dimensional Interactive Application (CATIA) and SolidWorks from Dassault Systems; and Ptolemy from the University of California at Berkeley.

Figure 3:
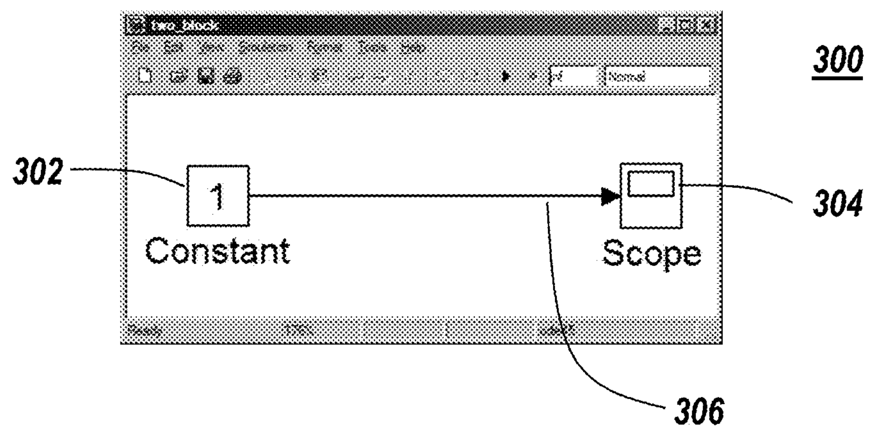
FIG. 3 illustrates a first example block diagram model representing an exemplary system.

The TCE 200 may include provisions for generating graphical model 206 and using graphical model 206 to simulate a system that is represented by graphical model 206. FIG. 3 illustrates an example embodiment 300 of graphical model 206. Referring to FIG. 3, the embodiment 300 may contain one or more elements, such as constant block 302 and scope block 304. An element may represent an entity (e.g., a part) associated with a system represented by the embodiment 300. For example, the system may include a constant generator and a scope, which may be represented by blocks 302 and 305, respectively.

Editor 202 may be a block diagram editor that may allow, for example, a user, to specify, edit, annotate, save, publish, and/or print a graphical model 206. For example, graphical model 206 may be presented by editor 202 and editor 202 may contain one or more provisions for specifying, editing, annotating, saving, publishing, and/or printing graphical model 206. In addition, editor 202 may contain one or more provisions for editing code (e.g., source code), requirements, and/or tests that may be generated from or otherwise associated with graphical model 206.

Execution engine 204 may use graphical model 206 to simulate some or all of the system represented by graphical model 206. The simulation may include performing various computations, associated with the system, based on information associated with one or more elements contained in graphical model 206.

Analysis engine 208 of TCE 200 may analyze graphical model 206 to determine a degree of comprehensibility associated with graphical model 206. Analysis engine 208 may store one or more rules and/or metrics that may be applied to graphical model 206 for determining the degree of comprehensibility. According to various embodiments, the one or more rules and/or metrics may be stored at storage 210 of TCE 200.

For example, rules and/or metrics for determining a concrete complexity of graphical model 206 may include determining a number of, e.g., lines, blocks, intersecting block boundaries, blocks with different sizes, branch points of lines, crossing of lines, and/or bends of lines in graphical model 206. This determination may be made using calculating logic 212. Rules and/or metrics for determining the concrete complexity of graphical model 206 may also include rules and/or metrics that may be used to identify and/or assign a score to one or more of the, e.g. lines, blocks, crossing of lines, and/or bends of lines, in graphical model 206. The score may represent the degree of comprehensibility of the graphical elements and/or the graphical model to which the score is assigned.

The rules and/or metrics for determining the concrete complexity of graphical model 206 may also include calculating the layout dimensions, for example, to compare whether graphical model 206 or each of the hierarchical elements of graphical model 206 can be displayed in entirety on a given screen resolution.

Rules and/or metrics for determining an abstract complexity of graphical model 206 may include determining a number of special or complex graphical elements that exist in graphical model 206. The special or complex elements may include, e.g. multiplexor blocks, demultiplexor blocks, data store read blocks, data store write blocks, data store memory blocks, non-local goto blocks, non-local from blocks, function-call subsystems (including enabled subsystems and triggered subsystems), sequential logic blocks, graphical functions, state crossings, and/or wormholes. The number of special or complex graphical elements may be determined using calculating logic 212. Rules and/or metrics for determining the abstract complexity of graphical model 206 may also include counting the libraries that are referenced by the blocks in the graphical model. Rules and/or metrics for determining the abstract complexity of graphical model 206 may also include rules and/or metrics that may be used to identify and/or assign a score assigned to one or more of the special or complex graphical elements of graphical model 206.

Referring back to FIG. 3, in embodiment 300 line 306 connects block 302 with block 304. Assuming a presence of each block and each line in embodiment 300 is counted as one unit, the degree of concrete complexity of embodiment 300 may be determined to be three (i.e., 2 block plus one line). Note that embodiment 300 does not include graphical elements, such as multiplexor blocks, demultiplexor blocks, data store read blocks, data store write blocks, data store memory blocks, non-local goto blocks, non-local from blocks, function-call subsystems (including enabled subsystems and triggered subsystems), sequential logic blocks, graphical functions, state crossings, and/or wormholes. Thus, embodiment 300 may be considered to not include any special or complex graphical elements. Accordingly, an abstract complexity of the embodiment 300 may be determined to be zero. A degree of comprehensibility of the embodiment 300 may be determined as a sum of the determined concrete complexity and the determined abstract complexity. Thus the degree of comprehensibility of embodiment 300 may be determined to be three (i.e., 3+0=3).

Figure 4:
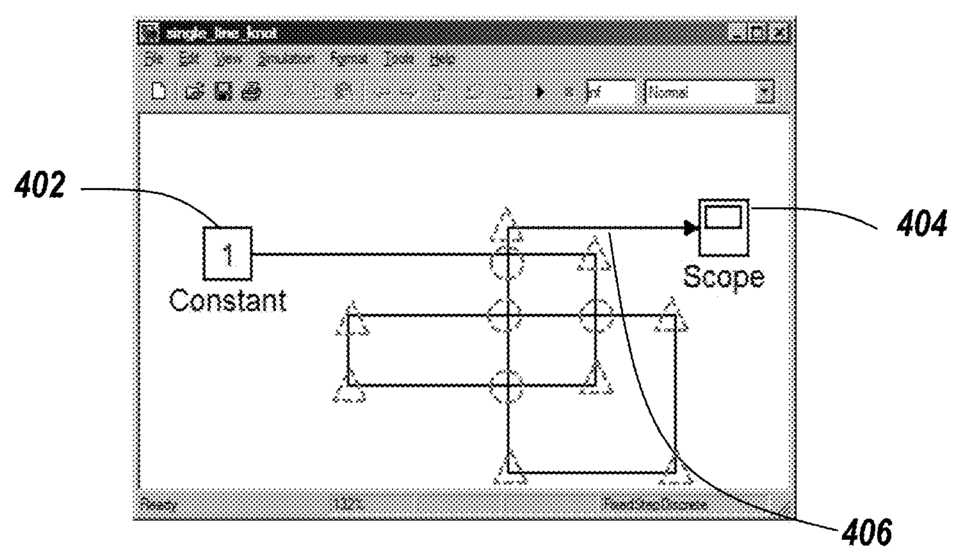
FIG. 4 illustrates a second example block diagram model representing the same exemplary system as the first example block diagram model of FIG. 3.

FIG. 4 illustrates another embodiment 400 of graphical model 206. Like embodiment 300, embodiment 400 includes a constant block 402 connected to a scope block 404 via a line 406. However, embodiment 400 has a different graphical layout than embodiment 300. For example, line 406 follows a much more complex path from block 402 to block 404 than line 306 follows from block 302 to block 304.

A degree of comprehensibility of block diagram 400 may be determined as follows. As noted above, embodiment 400 includes constant block 402, scope block 404, and line 406 that connects constant block 402 to scope block 404. Embodiment 400 also includes eight line bends (illustrated in FIG. 4 using dashed triangles) and four line crossings (illustrated in FIG. 4 using dashed circles). Assuming each block, line, line bend, and line crossing is counted as one unit, a degree of concrete complexity of embodiment 400 may be determined to be fifteen (i.e., 2 blocks+1 line+8 line bends+4 line crossings=15).

The metric to compute the complexity may include weights assigned to the graphical elements. For example, the line crossings may be weighted twice as important as the line bends and the block presence. If the foregoing metric with different weights is applied to block diagram model 400, the concrete complexity of block diagram model 400 may be determined to be nineteen, i.e. 2 (number of blocks)+1 (number of lines)+8 (number of line bends)+2 (weight, penalty)*4 (number of line crossings)=19.

Note that embodiment 400 does not include any multiplexor blocks, demultiplexor blocks, data store read blocks, data store write blocks, data store memory blocks, non-local goto blocks, non-local from blocks, function-call subsystems, sequential logic blocks, graphical functions, state crossings, and/or wormholes. Thus, embodiment 400 may be considered to not include any special or complex graphical element. Accordingly, an abstract complexity of embodiment 400 may be determined to be zero. Line 406 represents a relation between constant block 402 and scope block 404 that is the same as the relation between constant block 302 and scope block 304. It may be determined that line 406 does not add to the abstract complexity of block diagram 400 compared to block diagram 300. A degree of comprehensibility of block diagram 400 may be determined by summing the determined concrete complexity and the determined abstract complexity. As such, the degree of comprehensibility of embodiment 400 may be determined to be fifteen (i.e., 15+0=15).

Embodiments 300 and 400 may represent the same system. Note, though, that embodiment 300 has a lower score than embodiment 400. Accordingly, the comprehensibility of the embodiment 300 is higher compared to the embodiment 400. Accordingly, embodiment 300 may be deemed to be a more efficient, better representation of the system than embodiment 400.

TCE 200 may provide recommendations based on a degree of comprehensibility of a graphical model. The recommendations may be for improving the degree of comprehensibility of the graphical model. For example, suppose embodiment 300 and embodiment 400 graphically represent the same system. Further suppose that TCE 200 may recommend a first graphical model over a second graphical model if a determined degree of comprehensibility for the first model is represented by a number that has a lower value than a number used to represent a degree of comprehensibly for the second model. As noted above, the value of the number used to represent the degree of comprehensibility for embodiment 300 is lower than the number used to represent the degree of comprehensibility for embodiment 400. Thus, TCE 200 may recommend that embodiment 300 be used instead of embodiment 400 for representing the system.

Figure 5:
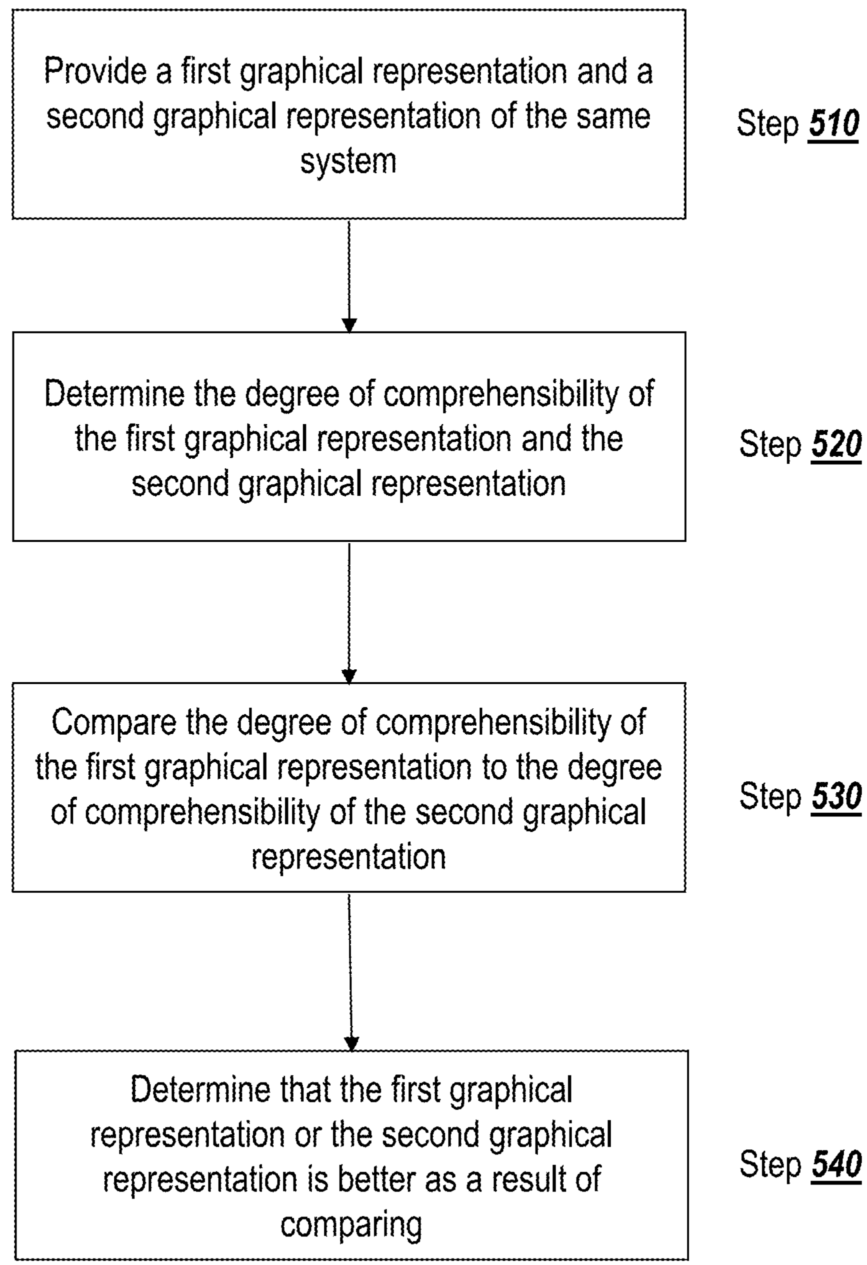
FIG. 5 illustrates a flowchart of example acts that may be used to compare a degree of comprehensibility of two different graphical representations of the same system.

FIG. 5 illustrates a flowchart 500 of example acts that may be used to compare a degree of comprehensibility of two different graphical representations (e.g., graphical models) of the same system. Referring to FIG. 5, at step 502, a first graphical representation and a second graphical representation of a system are provided. At step 504, the degree of comprehensibility of the first graphical representation and the degree of comprehensibility of the second graphical representation are determined. As provided above, the degree of comprehensibility of a graphical model may be determined by determining the degree of concrete complexity and the degree of abstract complexity of the graphical model. At step 504, the degree of comprehensibility of the first graphical representation is compared to the degree of comprehensibility of the second graphical representation. At step 506, as a result of the comparing step 504, the first graphical representation or the second graphical representation is determined as the better representation for the system. For example, if a degree of comprehensibility of a first graphical model is lower/higher than a degree of comprehensibility of a second graphical model, the first graphical model may be deemed to be better suited for representing the system.

Figure 6A:
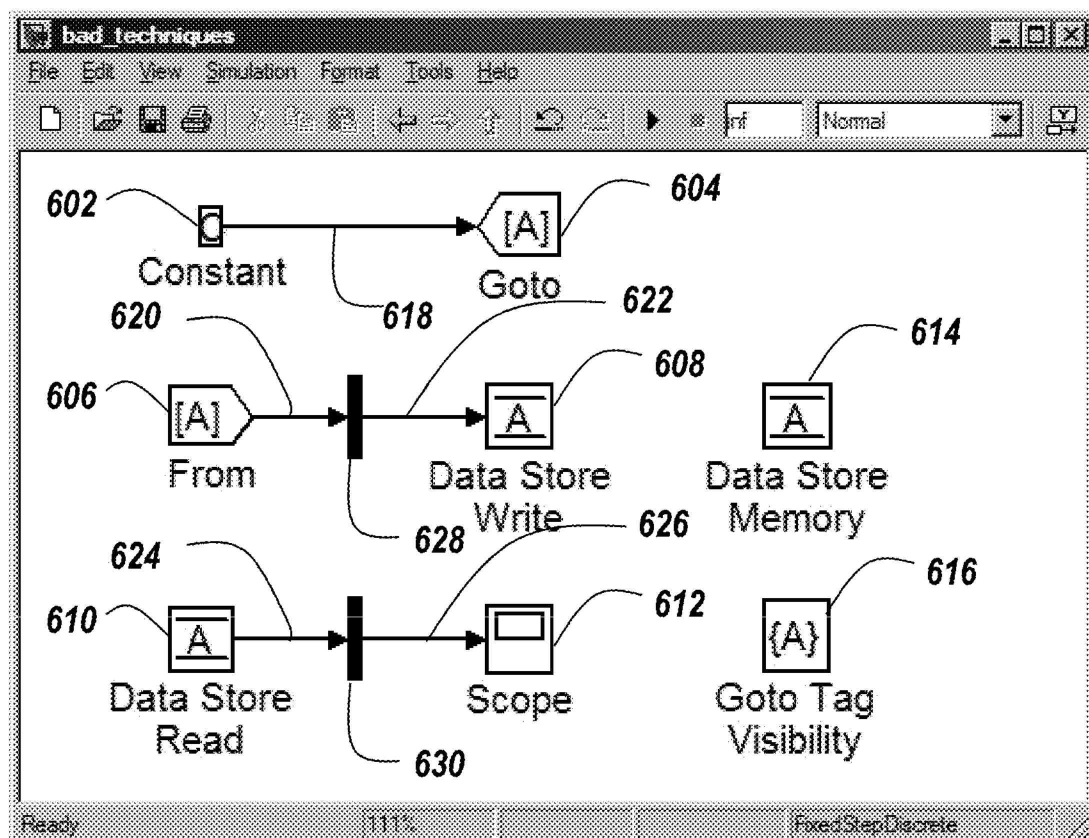
FIG. 6A illustrates an example block diagram model that includes one or more special or complex graphical elements.

FIG. 6A illustrates another embodiment 600 of graphical model 206. Embodiment 600 includes a constant block 602, a goto block 604, a from block 606, a data store write block 608, a data store memory block 610, a data store read block 612, a scope block 614, a goto tag visibility block 616, a first line 618, a second line 620, a third line 622, a fourth line 624, a fifth line 626, a multiplexor block 628, and a demultiplexor block 630. TCE 200 may determine which graphical elements in embodiment 600 are special or complex elements and which graphical elements in embodiment 600 are simple elements. Special or complex graphical elements may require additional overhead for processing and/or may be associated with an abstract complexity of the embodiment 600. The simple graphical elements may be associated with a concrete complexity of the embodiment 600.

Referring to FIG. 6A, suppose special or complex graphical elements of embodiment 600 include goto block 604, from block 606, data store write block 608, data store memory block 610, data store read block 612, goto tag visibility block 616, multiplexor block 628 and the demultiplexor block 630. Assuming that each special or complex graphical element is counted as one unit, the degree of abstract complexity of embodiment 600 may be determined as eight, since there are eight special or complex graphical elements in embodiment 600.

Now suppose simple graphical elements of embodiment 600 include constant block 602, scope block 614, first line 618, second line 620, third line 622, fourth line 624, and fifth line 626. Note that embodiment 600 does not contain line bends or line crossings. Assuming that each simple graphical element is counted as one unit, the degree of concrete complexity of embodiment 600 may be determined to be seven. A degree of comprehensibility of embodiment 600 may be determined as a sum of the abstract complexity and the concrete complexity. Thus, the degree of comprehensibility of embodiment 600 may be determined to be fifteen.

The appearance of constant block 602 may partially determine the concrete complexity. For example, the constant value output from the constant block may be displayed in the block icon (e.g., in constant block 302). Accordingly, the concrete complexity of a graphical model that displays the constant value in the constant block may be less than the concrete complexity of a graphical model that does not display the constant value in the constant block. In another example, the size of a block may affect the concrete complexity where inordinate large or small blocks may increase the concrete complexity. In yet another example, the size of a graphical element, such as a block or line, may affect the concrete complexity where the size may obscure graphical annotations. In yet another example, display options such as foreground and background color, drop shadow, line style, etc., may affect the concrete complexity where different and inconsistent options in one graphical model may increase the concrete complexity.

Special or complex graphical elements in a graphical model may also be counted toward the degree of concrete complexity of the graphical model. Given this approach, the degree of concrete complexity of embodiment 600 may be determined to be fifteen and the degree of comprehensibility of embodiment 600 may be determined to be twenty-three (i.e., the sum of the abstract complexity, which is eight, and the concrete complexity, which is fifteen).

A graphical model may be hierarchical in that it may have an internal modeling hierarchy. For example, a graphical model may contain a subsystem block that contains one or more blocks. The subsystem block may be at a first level in the graphical model's hierarchy and the one or more blocks contained in the subsystem block may be at one or more levels below the first level in the graphical model's hierarchy.

For hierarchical graphical models, a degree of comprehensibility of the graphical model may include degrees of comprehensibility of each hierarchical layer of the graphical model. For example, a graphical model may include a subsystem block that has one or more blocks that are one level below the subsystem block and one or more blocks that are two levels below the subsystem block. The degree of comprehensibility of the graphical model may include a degree of comprehensibility of the blocks that are one level below the subsystem block and a degree of comprehensibility of the blocks that are two levels below the subsystem block. The degree of comprehensibility of the graphical model may also include a weighted sum of the degree of comprehensibility of each subsystem, for example, by assigning a larger weight factor to the degree of comprehensibility of subsystems at lower levels of the hierarchy.

Techniques for determining a degree of concrete complexity and/or abstract complexity of a graphical model illustrated herein should not be construed as limiting. Various techniques, including but not limited to, assigning points to each type of graphical element, counting special or complex graphical elements twice, or other techniques may be used to determine the degree of concrete complexity and/or abstract complexity of a graphical model.

Figure 6B:
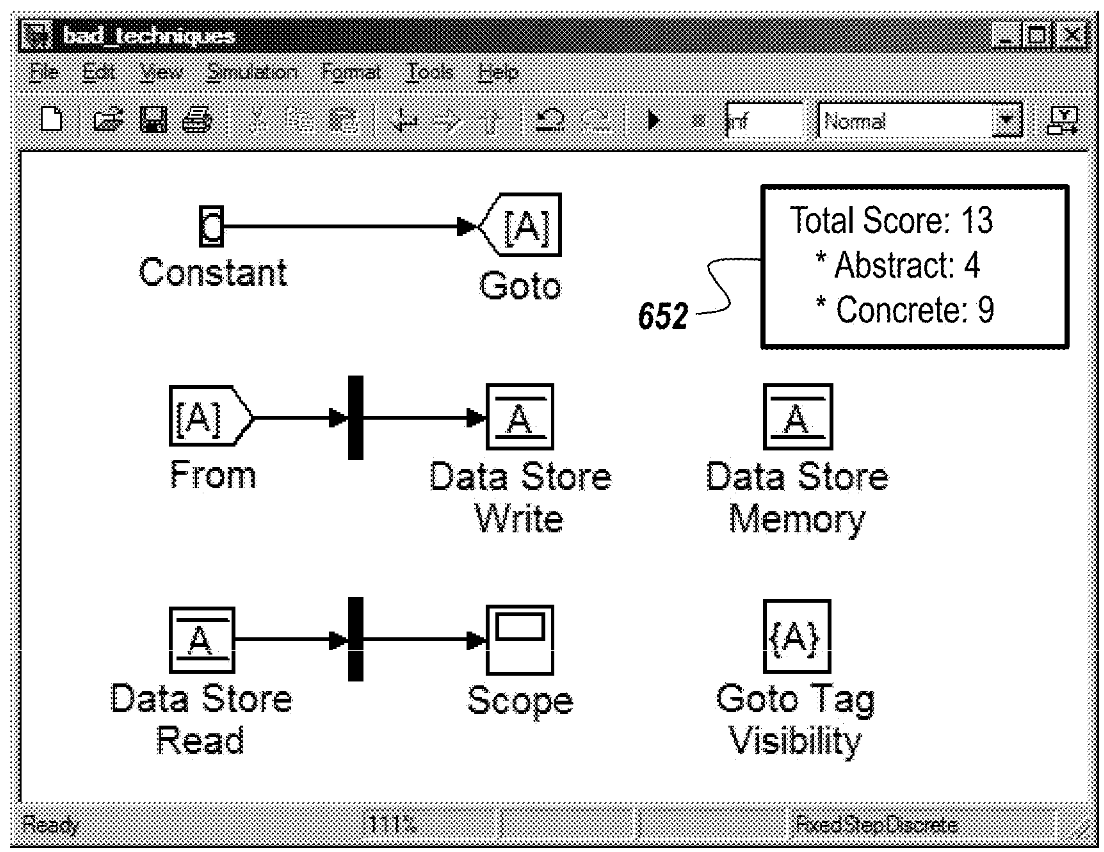
FIG. 6B illustrates communicating a degree of comprehensibility, of the example block diagram model illustrated in FIG. 6A, as a score.

After a degree of comprehensibility of a graphical model is determined, the degree of comprehensibility may be communicated, for example, to a user. For example, referring to FIG. 6B, a degree of comprehensibility for embodiment 600 may be indicated as a score 652. The score 652 may be communicated to a user by being displayed on a output device, such as output device 170. Note that score 652 may include a total score that may represent the degree of comprehensibility, an abstract complexity score and a concrete complexity score, that may represent an abstract complexity and concrete complexity, respectively, of embodiment 600.

Figure 6C:
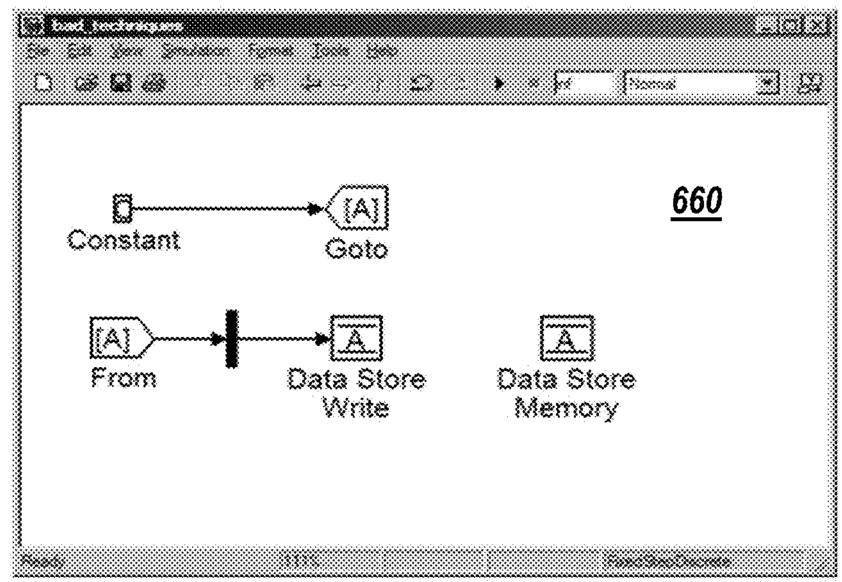
FIGS. 6C-6D illustrate communicating the degree of comprehensibility, of the example block diagram model illustrated in FIG. 6A, using visual cues, such as fading.
Figure 6D:
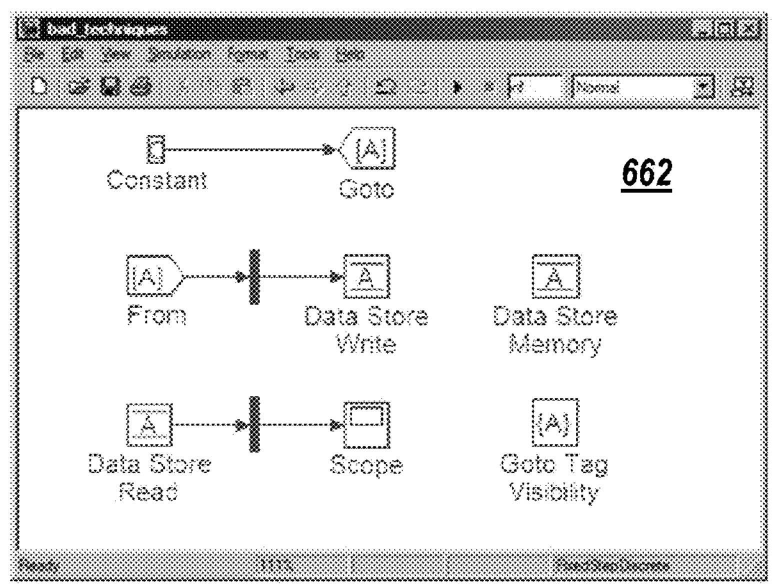

The degree of comprehensibility may be communicated using one or more visual and/or audible cues. The visual cues may include, for example, text, color, shading, and/or texture. For example, FIG. 6C presents a portion of embodiment 600. As more complexity is added embodiment 600, as illustrated in FIG. 6D, the degree of comprehensibility of embodiment 600 may diminish. This may be indicated by fading the presentation of embodiment 600 by as illustrated in FIG. 6D. The audible cues may include, for example, a beep sound to be heard when a graphical element is added to the model and when there is an alternative to the graphical element that results in a better overall comprehensibility for the model.

Figure 7:
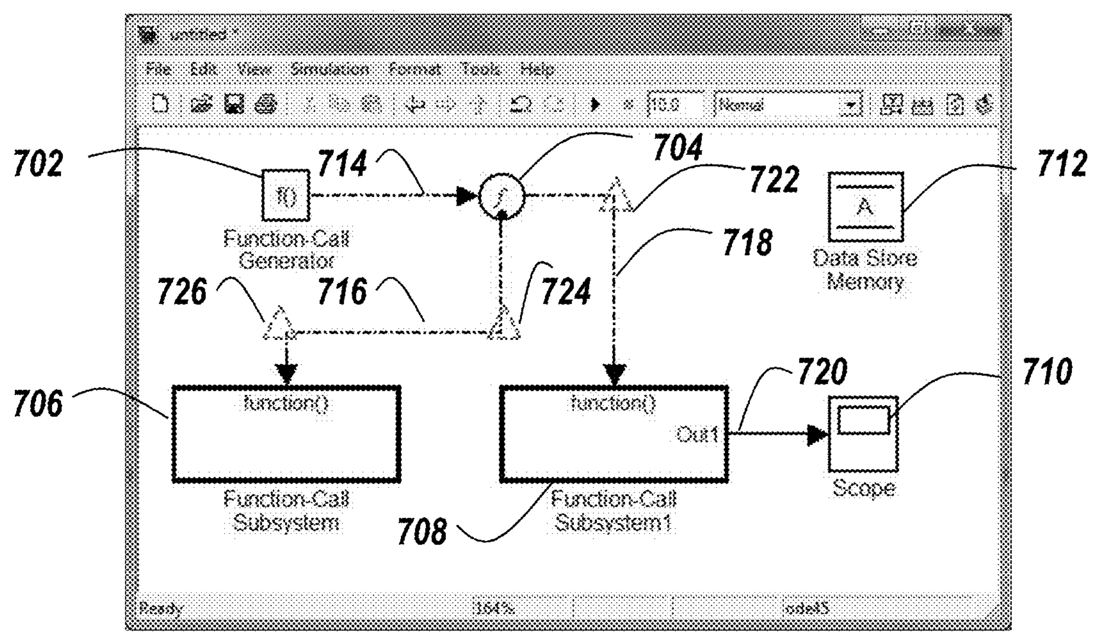
FIG. 7 illustrates an example block diagram model that includes one or more function-call subsystems as special or complex graphical elements.

FIG. 7 illustrates another embodiment 700 of graphical model 206. Embodiment 700 includes a function call generator block 702, a function call split block 704, a first function call subsystem block 706, a second function call subsystem block 708, a scope block 710, a data store memory block 712, a first line 714, a second line 716, a third line 718 and a fourth line 720. Embodiment 700 includes two function-call triggered subsystem blocks. The execution order of the function-call triggered subsystem blocks or the overall system behavior is not readily ascertainable from the graphical representation. The degree of complexity based on different metrics may be indicated as separate scores assigned to the graphical representation. TCE 200 may determine which graphical elements in embodiment 700 are special or complex elements and which graphical elements in embodiment 700 are simple elements.

Referring to FIG. 7, special or complex graphical elements of embodiment 700 may be determined as first function call subsystem block 704, second function call subsystem block 708 and data store memory block 712. Assuming that each special or complex graphical element is counted as one unit, the degree of abstract complexity of embodiment 700 may be determined as three, since there are three special or complex graphical elements in embodiment 700.

Simple graphical elements of embodiment 700 may be determined as function call generator block 702, function call split block 704, scope block 710, first line 714, second line 716, third line 718, a fourth line 720, a first line bend 722, a second line bend 724 and a third line bend 726. Assuming that each simple graphical element is counted as one unit, the degree of concrete complexity of embodiment 700 may be determined to be ten. A degree of comprehensibility of embodiment 700 may be determined as a sum of the abstract complexity and the concrete complexity. Thus, the degree of comprehensibility of embodiment 700 may be determined to be thirteen.

Figure 8A:
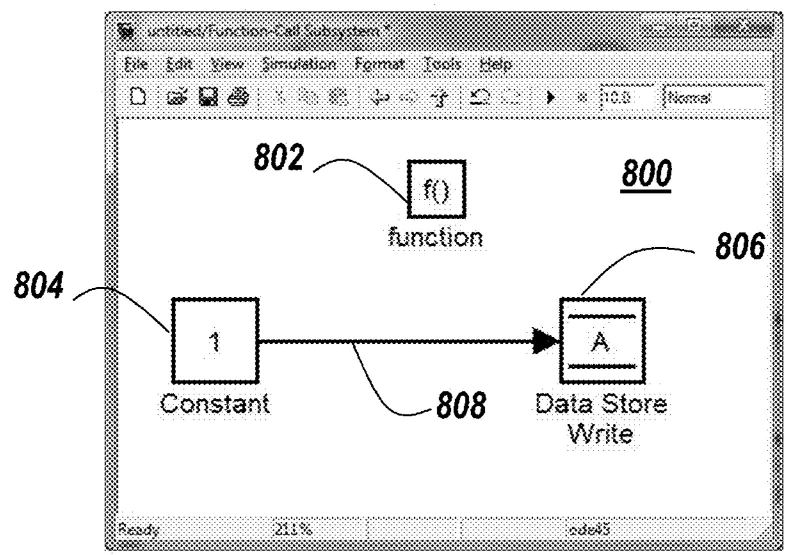
FIG. 8A illustrates an example block diagram model that includes a data store write element as a special or complex graphical element.

FIG. 8A illustrates another embodiment 800 of graphical model 206. Embodiment 800 includes a function-call trigger block 802, a constant block 804, a data store write block 806 and a first line 808. In embodiment 800, a subsystem block assigns a constant to a data store block. TCE 200 may determine which graphical elements in embodiment 800 are special or complex elements and which graphical elements in embodiment 800 are simple elements.

Referring to FIG. 8A, special or complex graphical elements of embodiment 800 may include data store write block 806. Assuming that each special or complex graphical element is counted as one unit, the degree of abstract complexity of embodiment 800 may be determined as one, since there is one special or complex graphical element in embodiment 800.

Simple graphical elements of embodiment 800 may include function-call trigger block 802, constant block 804 and first line 808. Note that embodiment 800 does not contain line bends or line crossings. Assuming that each simple graphical element is counted as one unit, the degree of concrete complexity of embodiment 800 may be determined to be three. A degree of comprehensibility of embodiment 800 may be determined as a sum of the abstract complexity and the concrete complexity. Thus, the degree of comprehensibility of embodiment 800 may be determined to be four.

Figure 8B:
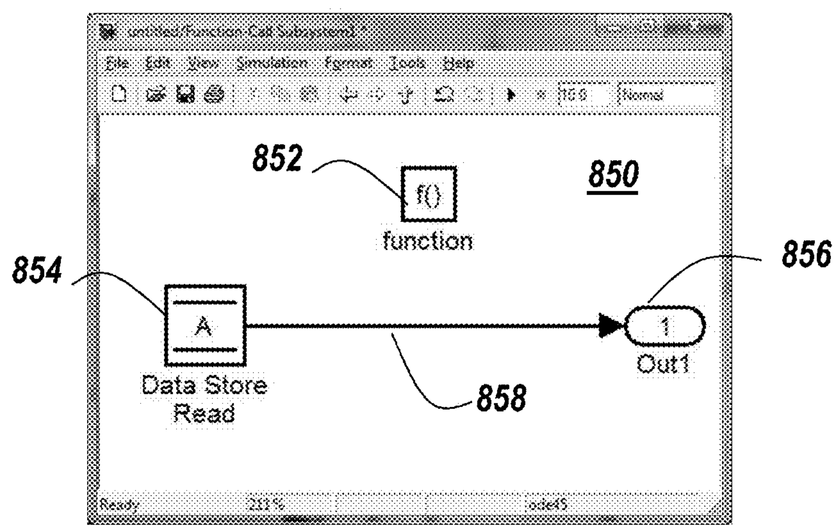
FIG. 8B illustrates an example block diagram model that includes a data store read element as a special or complex graphical element.

FIG. 8B illustrates another embodiment 850 of graphical model 206. Embodiment 850 includes a function-call trigger block 852, a data store read block 854, an output block 856 and a first line 858. In embodiment 850, a subsystem block reads the value form the data store block. TCE 200 may determine which graphical elements in embodiment 850 are special or complex elements and which graphical elements in embodiment 850 are simple elements.

Referring to FIG. 8B, special or complex graphical elements of embodiment 800 may be determined as data store read block 854. Assuming that each special or complex graphical element is counted as one unit, the degree of abstract complexity of embodiment 850 may be determined as one, since there is one special or complex graphical element in embodiment 850.

Simple graphical elements of embodiment 850 include function-call trigger block 802, output block 856 and first line 808. Assuming that each simple graphical element is counted as one unit, the degree of concrete complexity of embodiment 850 may be determined to be three. A degree of comprehensibility of embodiment 850 may be determined as a sum of the abstract complexity and the concrete complexity. Thus, the degree of comprehensibility of embodiment 850 may be determined to be four.

Figure 9A:
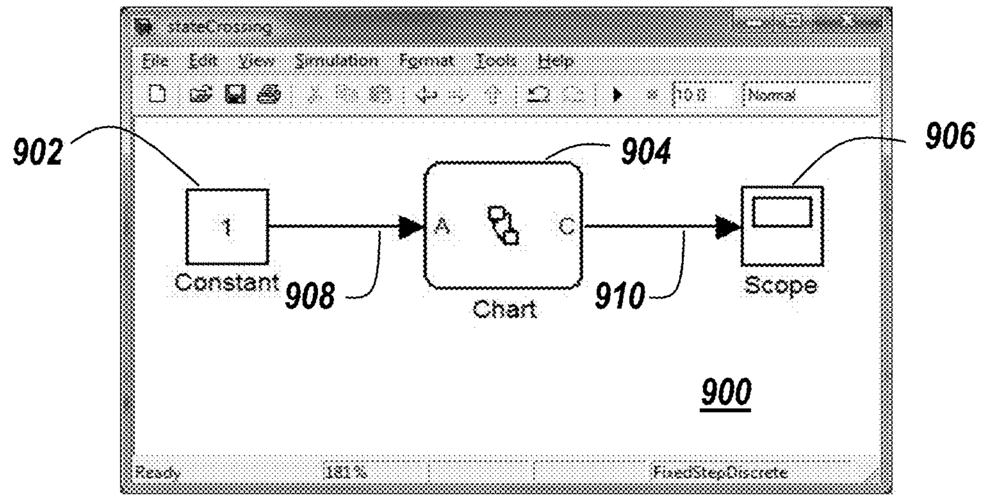
FIGS. 9A-9B illustrate an example block diagram model that includes a Stateflow chart element.

FIG. 9A illustrates another embodiment 900 of graphical model 206. Embodiment 900 illustrates state crossings in a graphical model by a transition. Embodiment 900 includes a constant block 902, a Stateflow chart 904, a scope block 906, a first line 908 and a second line 910. In embodiment 900, a constant value is presented to scope block 906 after passing through a Stateflow chart 904 that makes use of transitions that cross state boundaries. The Stateflow chart 904 is further explained below. TCE 200 may determine which graphical elements in embodiment 900 are special or complex elements and which graphical elements in embodiment 900 are simple elements.

Referring to FIG. 9A, there are no special or complex graphical elements of embodiment 900. Accordingly, the degree of abstract complexity of embodiment 900 may be determined as zero, since there is no special or complex graphical element in embodiment 900.

Simple graphical elements of embodiment 900 includes constant block 902, Stateflow chart 904, scope block 906, first line 908 and second line 910. Assuming that each simple graphical element is counted as one unit, the degree of concrete complexity of embodiment 900 may be determined to be five. However, the Stateflow chart 904 represents a subsystem. Before determining the degree of comprehensibility of embodiment 900, the degree of comprehensibility of the subsystem represented by Stateflow chart 904 should be determined.

Stateflow chart 904 contains a first state 914, a second state 916, a third state 918, a first transition line 922, a second transition line 924 and a third transition line 926. The first state 914 is entered by the default transition 920. The first unguarded transition 922 leaving first state 914 crosses second state 916 to enter third state 918. The routing of the transition line 922 complicates visual interpretation of the chart by mapping directly over another graphical element.

The logic of Stateflow chart 904 is transitive. The value A is assigned to B in first state 914. The value B is assigned to C in third state 918. To track the data logically, one should move to the top level, i.e. graphical model 900, of Stateflow chart 904 to see that A was an input to Stateflow chart 904 and that C was an output from Stateflow chart 904.

Figure 9B:
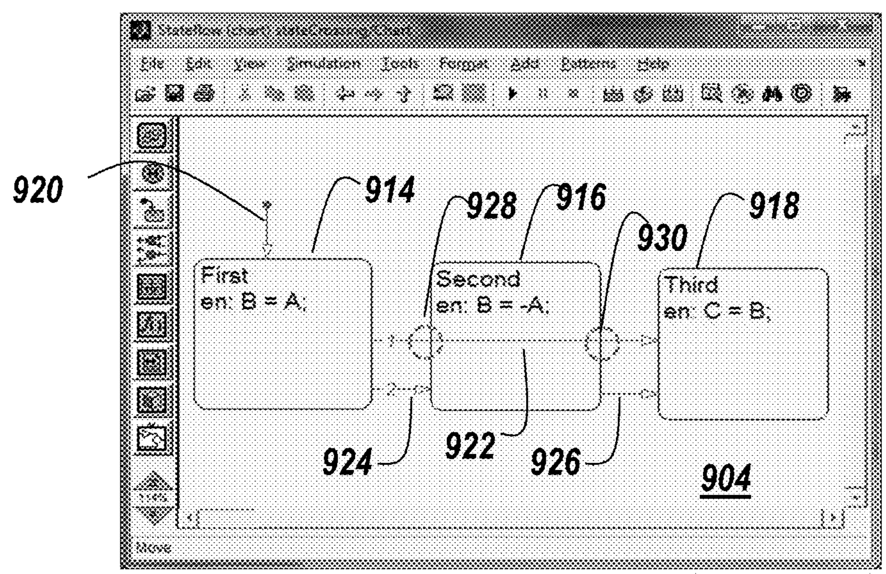

Referring to FIG. 9B, transition line 922 that crosses second state 916 requires additional effort for interpreting the functionality of transition line 922. There are two unguarded transitions, i.e. first transition 922 and second transition 924 leading away from the same state, i.e. first state 914. Accordingly, the degree of abstract complexity of Stateflow chart 904 may be determined as three.

Simple graphical elements of Stateflow chart 904 includes first state 914, second state 916, third state 918, default transition 920, first transition line 922, second transition line 924, third transition line 926, the first line crossing 928 and the second line crossing 930. Assuming that each simple graphical element is counted as one unit, the degree of concrete complexity of Stateflow chart 904 may be determined to be nine. A degree of comprehensibility of Stateflow chart 904 may be determined as a sum of the abstract complexity and the concrete complexity. Thus, the degree of comprehensibility of Stateflow chart 904 may be determined to be twelve.

Referring back to FIG. 9A, a degree of comprehensibility of embodiment 900 may be determined as a sum of degree of comprehensibility of the hierarchical levels. Thus, the degree of comprehensibility of embodiment 900 may be determined to be sixteen.

In another embodiment, the state crossings may be counted as units of concrete complexity. First transition line 922 crosses second state 916 twice. Assuming that each crossing is counted as a single unit, the degree of concrete complexity of Stateflow chart 904 may be determined to be nine. The degree of comprehensibility of embodiment 900 may then be determined to be eighteen.

Figure 10A:
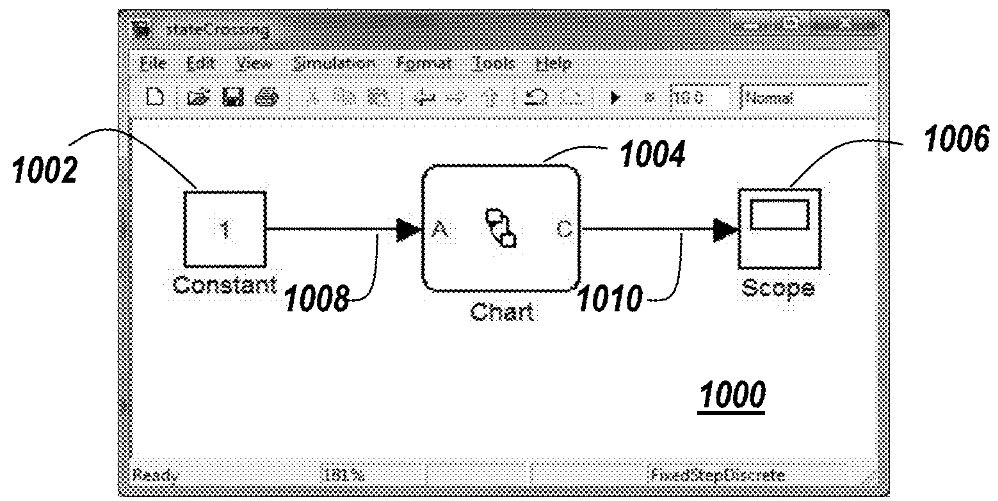
FIGS. 10A-10D illustrates an example hierarchical block diagram model that includes a Stateflow chart element.

FIG. 10A illustrates another embodiment 1000 of graphical model 206. Embodiment 1000 illustrates state crossings in a graphical model by a transition. Embodiment 1000 includes a constant block 1002, a Stateflow chart 1004, a scope block 1006, a first line 1008 and a second line 1010. In embodiment 1000, a constant value is presented to scope block 1006 after passing through a Stateflow chart 1004 that makes use of wormholes. The Stateflow chart 1004 is further explained below. TCE 200 may determine which graphical elements in embodiment 1000 are special or complex elements and which graphical elements in embodiment 1000 are simple elements.

Referring to FIG. 10A, there are no special or complex graphical elements of embodiment 1000. Accordingly, the degree of abstract complexity of embodiment 1000 may be determined as zero, since there is no special or complex graphical element in embodiment 1000.

Simple graphical elements of embodiment 1000 include constant block 1002, Stateflow chart 1004, scope block 1006, first line 1008 and second line 1010. Assuming that each simple graphical element is counted as one unit, the degree of concrete complexity of embodiment 1000 may be determined to be five. However, the Stateflow chart 1004 represents a subsystem. Before determining the degree of comprehensibility of embodiment 1000, the degree of comprehensibility of the subsystem represented by Stateflow chart 1004 should be determined.

Figure 10B:
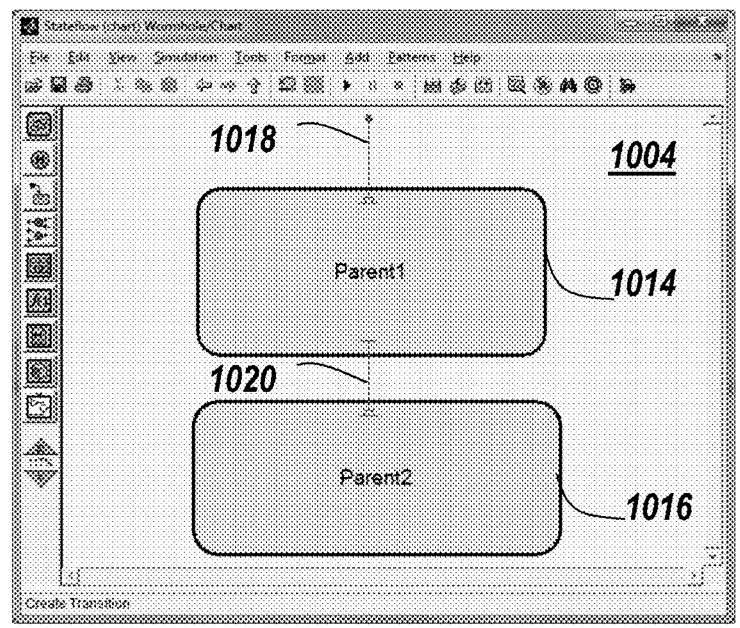

As illustrated in FIG. 10B, Stateflow chart 1004 contains a first parent 1014, a second parent 1016, a first transition 1018 and a second transition 1020. The default transition, i.e. first transition 1018, of Stateflow chart 1004 wormholes through the top level of the chart into the sub-chart below. The top level behavior is unclear and the viewer should descend into the state hierarchy to observe the behavior.

Referring to FIG. 10B, the degree of abstract complexity of Stateflow chart 1004 may be determined as two because of the complex graphical elements first transition 1018 and second transition 1020. First transition 1018 and second transition 1020 add to the abstract complexity because these transitions fail to terminate in the current level of model hierarchy.

Simple graphical elements of Stateflow chart 1004 include first subchart state 1014, second subchart state 1016, first transition 1018 and second transition 1020. First transition 1018 and second transition 1020 are also counted as simple graphical elements because they are illustrated in the graphical element. Alternatively, these graphical elements may be counted once, as complex graphical elements. Assuming that each simple graphical element is counted as one unit, the degree of concrete complexity of Stateflow chart 1004 may be determined to be four. A degree of comprehensibility of Stateflow chart 1004 may be determined as a sum of the abstract complexity and the concrete complexity. Thus, the degree of comprehensibility of Stateflow chart 1004 may be determined to be six.

Figure 10C:
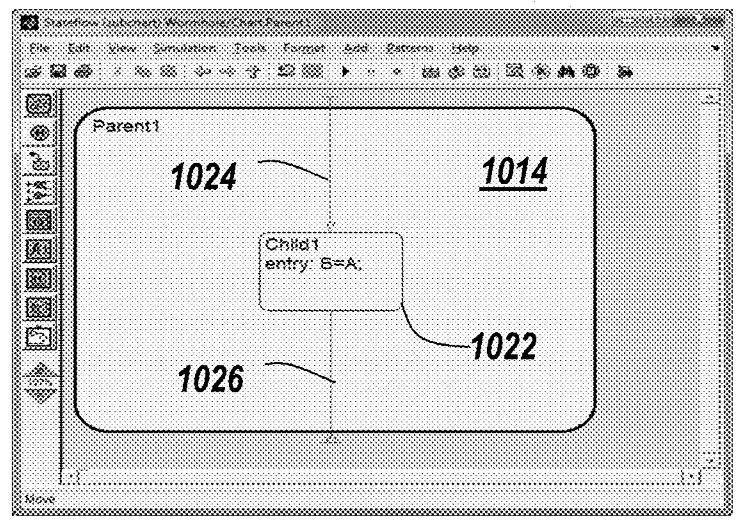

FIG. 10C illustrates the details of first subchart state 1014. First subchart state 1014 includes a first state 1022, a first transition 1024 and a second transition 1026. The first state 1022 accepts a wormhole transition to a state and then transitions across state boundaries worm-holing to another level of hierarchy. The logical flow cannot be followed with the information on FIG. 10C. In the graphical model illustrated in FIG. 10C, the behavior of the state is transitive. The value A is assigned to B. To track the data logically, one most move to the top level of the graphical model to see that A was an input to Stateflow chart 1004. Note that Stateflow chart 1004 is two hierarchical levels above state 1022.

Referring to FIG. 10C, the degree of abstract complexity of first subchart state 1014 may be determined as two because of the complex graphical elements first transition 1024 and second transition 1026 because these transitions do not terminate on the current level of model hierarchy. First transition 1024 and second transition 1026 do not have both endpoints, i.e. a start point and an end point, on the same level of the model hierarchy.

Simple graphical elements of first subchart state 1014 include first state 1022, first transition 1024 and second transition 1026. First transition 1024 and second transition 1026 are also counted as simple graphical elements because they are illustrated in the graphical element. Alternatively, these graphical elements may be counted once, as complex graphical elements. Assuming that each simple graphical element is counted as one unit, the degree of concrete complexity of first subchart state 1014 may be determined to be three. A degree of comprehensibility of first subchart state 1014 may be determined as a sum of the abstract complexity and the concrete complexity. Thus, the degree of comprehensibility of first subchart state 1014 may be determined to be five.

Figure 10D:
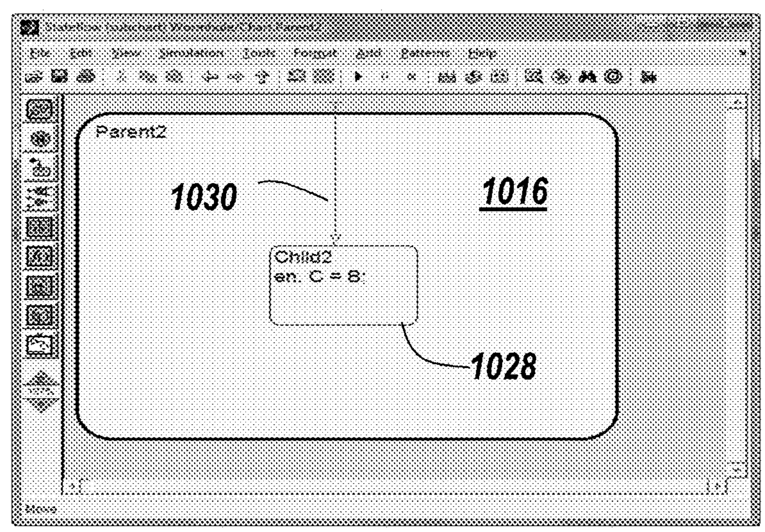

FIG. 10D illustrates the details of second subchart state 1016. Second subchart state 1016 includes a second state 1028 and a first transition 1030. Second state 1028 accepts a wormhole transition to a state. The logical flow cannot be followed with the information on FIG. 10D. In the graphical model illustrated in FIG. 10D, the behavior of the state is transitive. The value B is assigned to C. To track the data logically, one most move to the top level of the graphical model to see that C was an output from Stateflow chart 1004. Note that Stateflow chart 1004 is two hierarchical levels above state 1028.

Referring to FIG. 10D, the degree of abstract complexity of second parent 1016 may be determined as one because of the complex graphical element first transition 1030.

Simple graphical elements of second subchart state 1016 include second state 1028 and first transition 1030. First transition 1030 is also counted as simple graphical element because it is illustrated in the graphical element. Alternatively, first transition 1030 may be counted once, as a complex graphical element. Assuming that each simple graphical element is counted as one unit, the degree of concrete complexity of second subchart state 1016 may be determined to be two. A degree of comprehensibility of second subchart state 1016 may be determined as a sum of the abstract complexity and the concrete complexity. Thus, the degree of comprehensibility of second subchart state 1016 may be determined to be three.

Referring back to FIG. 10A, a degree of comprehensibility of embodiment 1000 may be determined as a sum of degree of comprehensibility of the hierarchical levels. Thus, the degree of comprehensibility of embodiment 1000 may be determined to be nineteen, i.e. 5+6+5+3=19.

Referring back to FIG. 10B, the content of first subchart state 1014 and second subchart state 1016 cannot be readily observed. Accordingly, first subchart state 1014 and second subchart state 1016 may be counted as complex graphical elements. The degree of abstract complexity of Stateflow chart 1004 may then be determined as four because of the complex graphical elements first transition 1018 and second transition 1020, as well as complex graphical elements first subchart state 1014 and second subchart state 1016. The degree of comprehensibility of embodiment 1000 may then be determined to be twenty-one.

Figure 11:
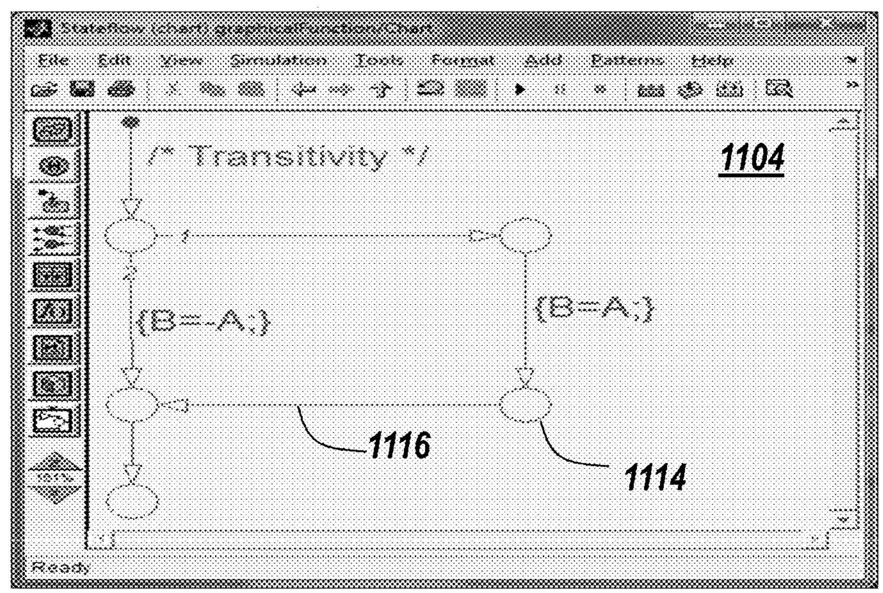
FIG. 11 illustrates an contents of a graphical function in an exemplary Stateflow chart element.

FIG. 11 illustrates content of a graphical function 1104 in an exemplary Stateflow chart. Content of the graphical function 1104 includes five junctions 1114 and six transitions 1116. One of the six transitions 116 is a default transition that enters the first junction. Two unguarded transitions exit the first junction. One path assigns the input to the output (A to B), the other assigns the opposite of the input to the output (−A to B). To track the data logically, one most move to the context where the graphical function is called to see that A was the input and that B was the output.

Referring to FIG. 11, the degree of abstract complexity of content of graphical function 1104 may be determined as zero because content of graphical function 1104 does not include complex graphical elements.

Simple graphical elements of content of graphical function 1104 include five junctions 1114 and six transitions 1116. Assuming that each simple graphical element is counted as one unit, the degree of concrete complexity of content of graphical function 1104 may be determined to be eleven. A degree of comprehensibility of content of graphical function 1104 may be determined as a sum of the abstract complexity and the concrete complexity. Thus, the degree of comprehensibility of content of graphical function 1104 may be determined to be eleven.

In another embodiment, each of the two assignment operations on the transitions may add one unit to the concrete complexity. The degree of comprehensibility of content of graphical function 1104 may then be determined to be thirteen.

Figure 12A:
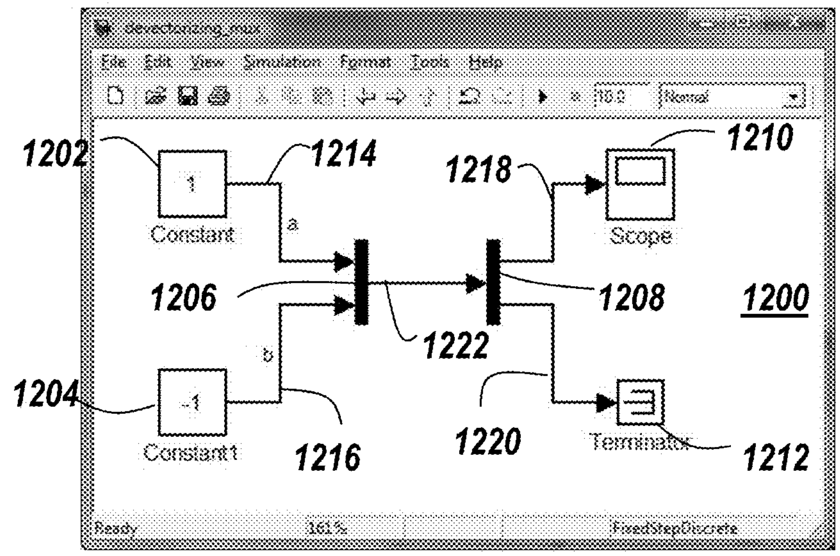
FIG. 12A illustrates an example block diagram model that includes multiplexor and demultiplexor elements as a special or complex graphical element.

FIG. 12A illustrates another embodiment 1200 of graphical model 206. Embodiment 1200 includes a first constant block 1202, a second constant block 1204, a multiplexor block 1206, a demuliplexor block 1208, a scope block 1210, a terminator block 1212, a first line 1214, a second line 1216, a third line 1218, a fourth line 1220 and a fifth line 1222. Embodiment 1200 includes multiplexor block 1206 and demultiplexor block 1208. The value of first constant block 1202 and second constant block 1204 is passed into multiplexor block 1206 and then removed with demultiplexor block 1208. Although multiple values are passed into multiplexor block 1206, the order of these inputs should be tracked by the individual interpreting the model. The data information is counted as part of the abstract syntax score because the information about the data is tracked by the interpreter of the model. TCE 200 may determine which graphical elements in embodiment 1200 are special or complex elements and which graphical elements in embodiment 1200 are simple elements.

Referring to FIG. 12A, suppose special or complex graphical elements of embodiment 1200 include multiplexor block 1206 and demultiplexor block 1208. Assuming that each special or complex graphical element is counted as one unit, the degree of abstract complexity of embodiment 1200 may be determined as two, since there are two special or complex graphical elements in embodiment 1200.

Simple graphical elements of embodiment 1200 include first constant block 1202, second constant block 1204, scope block 1210, terminator block 1212, first line 1214 second line 1216, third line 1218, fourth line 1220 and fifth line 1222. Note that first line 1214, second line 1216, third line 1218 and fourth line 1220 each include two line bends. Multiplexor block 1206 and demultiplexor block 1208 also add to the concrete complexity of the model. Assuming that each simple graphical element is counted as one unit, the degree of concrete complexity of embodiment 1200 may be determined to be nineteen. A degree of comprehensibility of embodiment 1200 may be determined as a sum of the abstract complexity and the concrete complexity. Thus, the degree of comprehensibility of embodiment 1200 may be determined to be twenty-one.

Figure 12B:
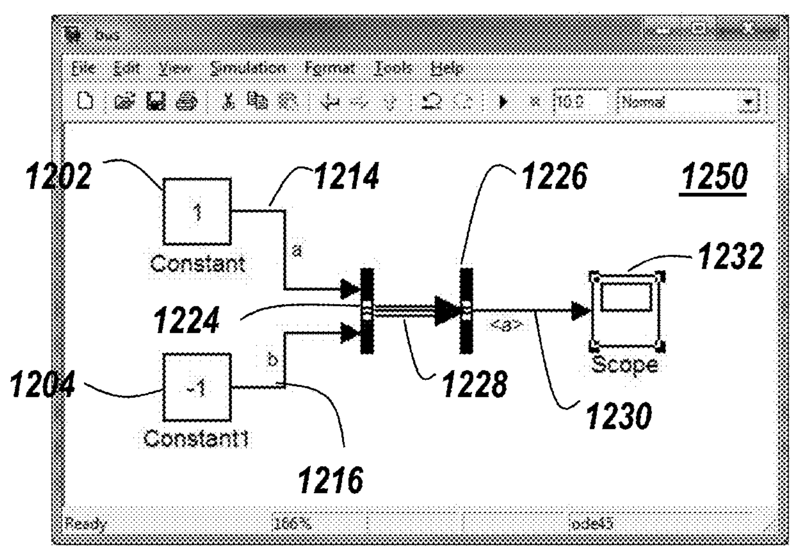
FIG. 12B illustrates an example block diagram model representing the same exemplary system as the example block diagram model of FIG. 12A.

FIG. 12B illustrates another embodiment 1250 of graphical model 206. Embodiment 1250 represents the same system modeled by embodiment 1200. Embodiment 1250 includes a first constant block 1202, a second constant block 1204, a bus creator block 1224, a bus selector block 1226, a scope block 1210, a first line 1214, a second line 1216, a third line 1228 and a fourth line 1230. Embodiment 1250 includes bus creator block 1224 and bus selector block 1226. The value of first constant block 1202 and second constant block 1204 is passed into bus creator block 1224 and then removed with bus selector block 1226. Although multiple values are passed into bus creator block 1224, the names of the signals are stored by bus creator block 1224 itself. Bus creator block 1224 and bus selector block 1226 are not counted as part of the abstract syntax score because the information about the data is tracked by the model as opposed to the interpreter of the model. TCE 200 may determine which graphical elements in embodiment 1250 are special or complex elements and which graphical elements in embodiment 1250 are simple elements.

Referring to FIG. 12B, embodiment 1250 does not include any special or complex graphical elements. Accordingly, the degree of abstract complexity of embodiment 1250 may be determined as zero, since there are no special or complex graphical elements in embodiment 1250.

Simple graphical elements of embodiment 1250 includes first constant block 1202, second constant block 1204, bus creator block 1224, bus selector block 1226, scope block 1210, first line 1214, second line 1216, third line 1228 and fourth line 1230. Note that first line 1214 and second line 1216 each includes two line bends. Assuming that each simple graphical element is counted as one unit, the degree of concrete complexity of embodiment 1250 may be determined to be thirteen. A degree of comprehensibility of embodiment 1250 may be determined as a sum of the abstract complexity and the concrete complexity. Thus, the degree of comprehensibility of embodiment 1250 may be determined to be thirteen.

Alternatively, because of the different line style, the third line 1228 may count towards concrete complexity more than unit, for example three units. The degree of concrete complexity of embodiment 1250 may then be determined to be fifteen and the degree of comprehensibility of embodiment 1250 may be determined to be fifteen as well.

Figure 13:
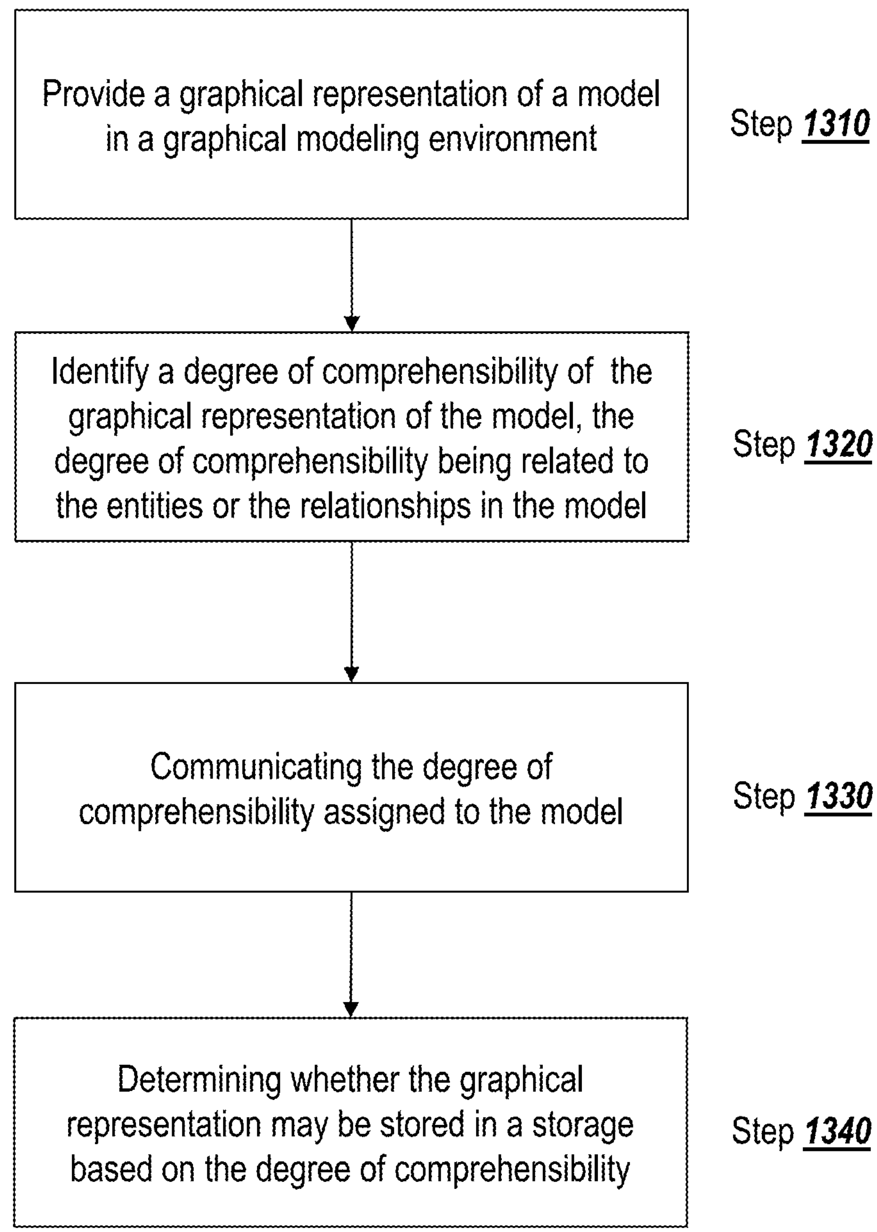
FIG. 13 illustrates a flowchart of example acts that may be used to identify a degree of comprehensibility of a graphical representation of a model.

FIG. 13 illustrates a flowchart 1300 of example acts that may be used to identify a degree of comprehensibility of a graphical representation of a model. Referring to FIG. 13, at step 1310, a graphical representation of a model is provided in a graphical modeling environment. At step 1320, a degree of comprehensibility associated with the graphical representation of the model is identified. The degree of comprehensibility may be identified based at least in part on one or more visual characteristics of one or more elements in the graphical representation. For example, the degree of comprehensibility may be identified based on at least one of entities in the model or relationships in the model that may be included in the graphical representation. At step 1330, the degree of comprehensibility assigned to the model is communicated. The degree of comprehensibility may be communicated, for example, via a visual display. At step 1340, the degree of comprehensibility may be used to determine whether the graphical representation of the model may be stored in the storage.

TCE 200 may omit storing graphical model 206 in a storage depending on a degree of comprehensibility of the graphical model 206. For example, if the degree of comprehensibility is outside of a predetermined acceptable range of degree of comprehensibility, TCE 200 may omit storing the graphical model 206.

TCE 200 may also prevent incorporating additional graphical elements into the graphical model and/or display a message based on the degree of comprehensibility of the graphical model. For example, if the degree of comprehensibility is above a pre-determined maximum limit, TCE 200 may prevent adding additional graphical elements that may make the graphical model less comprehensible. Alternatively, or in addition to, TCE 200 may display a message that may indicate, for example, the degree of comprehensibility is above the pre-determined maximum limit.

TCE 200 may prevent storing or further modifying the graphical model in light of the degree of comprehensibility of the graphical model based on, for example, a user profile. Here, for example, a senior user may be allowed to store or modify a graphical model with a high degree of comprehensibility while a junior user may be prevented from storing or modifying the same graphical model. The user profile may be associated with seniority, an organizational group association, user's role in the organization, or some other criteria.

Figure 14:
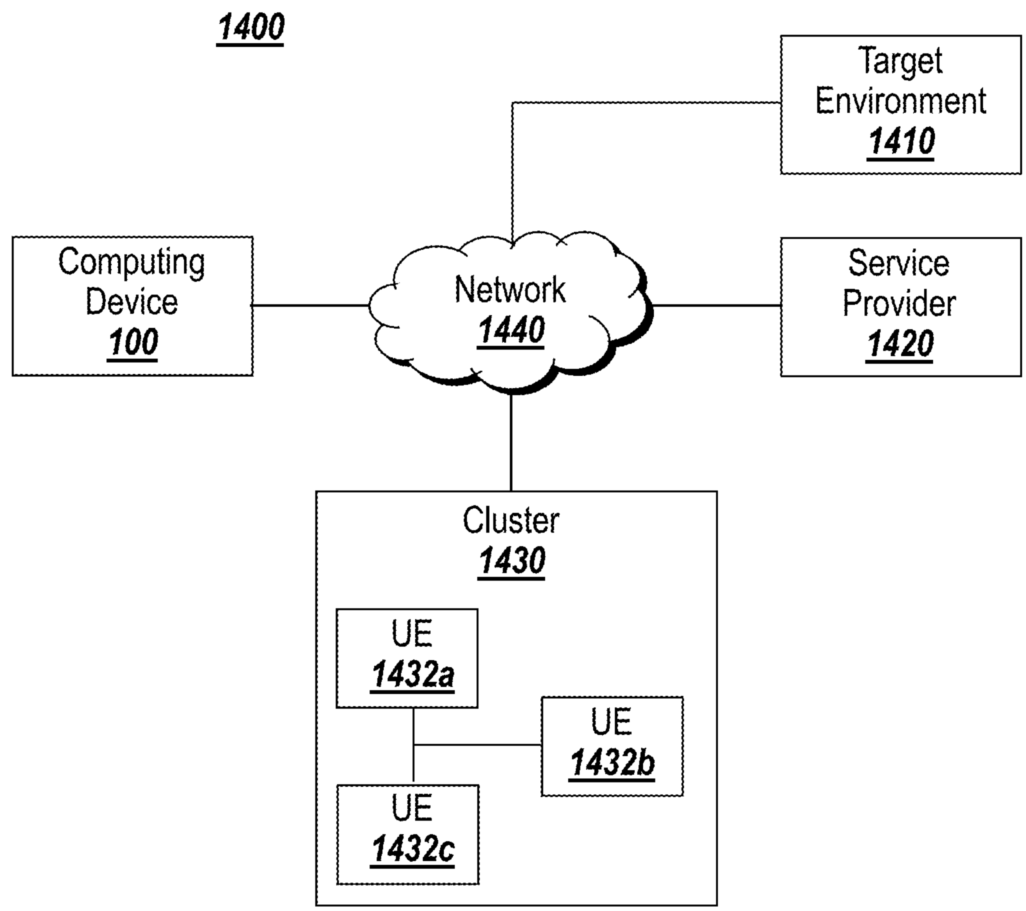
FIG. 14 illustrates a block diagram of an example of a distributed computing environment that may implement one or more embodiments of the invention.

One or more embodiments of the invention may be implemented in a distributed environment. FIG. 14 illustrates an example of a distributed environment 1400 that may implement one or more embodiments of the invention. Referring to FIG. 14, environment 1400 may contain various components including computing device 100, target environment 1410, service provider 1420, cluster 1430, and communications network 1440. Note that the distributed environment 1400 is just one example of a distributed environment that may be used with one or more embodiments of the invention. Other distributed environments that may be used with one or more embodiments of the invention may contain more components or fewer components than illustrated in FIG. 14. Moreover, the components in the distributed environments may be arranged differently than the arrangement shown in FIG. 14. In addition, the distributed environments may implement various "cloud computing" frameworks.

Details of computing device 100 were described above with respect to FIG. 1. In distributed environment 1400, computing device 100 may, among other things, exchange information (e.g., data) with other components in the communications network 1440 (e.g., target environment 1410, service provider 1420, and cluster 1430). Computing device 100 may interface with the communications network 1440 via a communication interface 180.

Target environment 1410 may be configured to interpret and/or execute, for example, one or more embodiments of the invention, which may be generated in or otherwise made available to the distributed environment 1400. The communications network 1440 may include digital and/or analog aspects. Information exchanged in communications network 1440 may include machine-readable information having a format that may be adapted for use, for example, in the communications network 1440 and/or with one or more components in the communications network 1440.

For example, the information may be encapsulated in one or more packets that may be used to transfer the information through the communications network 1440. Information may be exchanged between components in the communications network 1440 using various communication protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, or other communication protocol.

The communications network 1440 may comprise various network devices, such as gateways, routers, switches, firewalls, servers, repeaters, address translators, etc. Some or all of the communications network 1440 may be wired (e.g., using wired conductors, optical fibers) and/or wireless (e.g., using free-space optical (FSO), radio frequency (RF), acoustic transmission paths). Some or all of the communications network 1440 may include a substantially open public network, such as the Internet. Some or all of the communications network 1440 may include a more restricted network, such as a private corporate network or virtual private network (VPN). It should be noted that implementations of communications networks and/or devices operating on communications networks described herein are not limited with regards to, for example, information carried by the communications networks, protocols used in the communications networks, and/or the architecture/configuration of the communications networks.

Cluster 1430 may include a number of units of execution (UEs) 1432 that may execute or interpret one or more embodiments of the invention or portions thereof on behalf of computing device 100 and/or another component, such as service provider 1420. The UEs 1432 may reside on a single device or chip or on multiple devices or chips. For example, the UEs 1432 may be implemented in a single ASIC or in multiple ASICs. Likewise, the UEs 1432 may be implemented in a single computer system or multiple computer systems. Other examples of UEs 1432 may include, for example, some combination of FPGAs, CPLDs, ASIPs, processors, multiprocessor systems-on-chip (MPSoCs), graphic processing units, and/or microprocessors. The UEs 1432 may be configured to perform operations on behalf of another component in the distributed environment 1400. For example, in an embodiment, the UEs 1432 are configured to execute portions of code associated with TCE 200. Here, TCE 200 may dispatch certain activities pertaining to one or more embodiments of the invention to the UEs 1432 for execution. The service provider 1420 may configure cluster 1430 to provide, for example, the above-described services to computing device 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to FIGS. 5 and 13, the order of the acts may be modified in other implementations. Further, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored in one or more tangible computer-readable storage media and may include computer-executable instructions that may be executed by processing logic, such as processing logic 120. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:

identifying, using a processing device, an element in an executable graphical model, where the element represents:

one or more entities in the graphical model, or one or more relationships in the graphical model;

determining, using the processing device, a comprehensibility score of the graphical model where the comprehensibility score is:

based on a syntactic complexity of the graphical model, the syntactic complexity including:

a visual complexity created by a presence of the one or more entities in the graphical model, or one or more connections associated with ones of the entities in the graphical model; and a modeling complexity created by a functionality or a data structure of the one or more entities in the graphical model; and receiving a request to store the executable graphical model in storage or to incorporate an element into the executable graphical model in the storage;

based on the comprehensibility score, granting the request by storing the executable graphical model in the storage or by incorporating the element into the executable model in the storage if the comprehensibility score surpasses a comprehensibility score threshold; or denying the request if the comprehensibility score does not surpass the comprehensibility score threshold.

2. The method of claim 1, further comprising:

displaying, on a display device, the comprehensibility score of the graphical model.

3. The method of claim 1, further comprising:

determining, using the processing device, the syntactic complexity of the graphical model using one or more syntax rules associated with the graphical model.

4. The method of claim 1, wherein the syntactic complexity depends on a presence of one or more of a block, a function-call subsystem, a sequential logic block, a graphical function, a line, a crossing of lines, a bend of line, a state crossing, a wormhole, a multiplexor block, a demultiplexer block, a data store block and a non-local goto block in the graphical model.

5. The method of claim 1, wherein the syntactic complexity includes an abstract component and a concrete component.

6. The method of claim 1, wherein the graphical model includes one or more hierarchical levels, and the method further comprising:

assigning one or more comprehensibility scores to the one or more hierarchical levels of the graphical model, wherein the comprehensibility score of the graphical model is based on the one or more comprehensibility scores assigned to the one or more hierarchical levels of the graphical model.

7. The method of claim 1, wherein the action is that the comprehensibility score of the graphical model is indicated in a graphical representation of the graphical model using one or more visual cues, the one or more visual cues including one or more of text, color, shading and texture.

8. The method of claim 1, wherein the executable graphical model executes in a time domain or an event domain.

9. One or more non-transitory computer-readable storage media storing: one or more instructions that, when executed on a processor, cause the processor to:

identify an element in an executable graphical model, where the element represents:

one or more entities in the graphical model, or one or more relationships in the graphical model;

determine a comprehensibility score of the graphical model where the comprehensibility score:

is based on a syntactic complexity of the graphical model, the syntactic complexity including:

a visual complexity created by a presence of the one or more entities in the graphical model, or one or more connections associated with ones of the entities in the graphical model; and a modeling complexity created by a functionality or a data structure of the one or more entities in the graphical model; and receive a request to store the executable graphical model in storage or to incorporate an element into the executable graphical model in the storage;

based on the comprehensibility score, grant the request by storing the executable graphical model in the storage or by incorporating the element into the executable model in the storage if the comprehensibility score surpasses a comprehensibility score threshold; or deny the request if the comprehensibility score does not surpass the comprehensibility score threshold.

10. The non-transitory computer-readable storage media of claim 9, further storing instructions for:

displaying the comprehensibility score of the graphical model on a display device.

11. The non-transitory computer-readable storage media of claim 9, further storing: one or more instructions that, when executed on the processor, cause the processor to:

determine the syntactic complexity of the graphical model using one or more syntax rules associated with the graphical model, wherein the syntactic complexity includes an abstract component and a concrete component.

12. The non-transitory computer-readable storage media of claim 9, wherein the syntactic complexity depends on a presence of one or more of a block, a function-call subsystem, a sequential logic block, a graphical function, a line, a crossing of lines, a bend of line, a state crossing, a wormhole, a multiplexor block, a demultiplexor block, a data store block and a non-local goto block in the graphical model.

13. The non-transitory computer-readable storage media of claim 9, further storing instructions for:

outputting one or more modeling recommendations that improve the comprehensibility score of the graphical model.

14. The one or more non-transitory computer-readable storage media of claim 9, wherein the executable graphical model executes in a time domain or an event domain.

15. A method comprising:

identifying, using a processing device, an element in an executable graphical model, where the element represents:

one or more entities in the graphical model, or one or more relationships in the graphical model;

determining, using the processing device, a comprehensibility score of the graphical model where the comprehensibility score is:

based on a syntactic complexity of the graphical model, the syntactic complexity including:

a visual complexity created by a presence of the one or more entities in the graphical model, or one or more connections associated with ones of the entities in the graphical model, and a modeling complexity created by a functionality or a data structure of the one or more entities in the graphical model; and outputting via a user interface a visual cue and/or an auditory cue indicative of how one or more of the entities in the executable graphical model affect the comprehensibility score.

16. The method of claim 15, further comprising:

displaying, on a display device, the comprehensibility score of the graphical model.

17. The method of claim 15, further comprising:

determining, using the processing device, the syntactic complexity of the graphical model using one or more syntax rules associated with the graphical model.

18. The method of claim 15, wherein the syntactic complexity depends on a presence of one or more of a block, a function-call subsystem, a sequential logic block, a graphical function, a line, a crossing of lines, a bend of line, a state crossing, a wormhole, a multiplexor block, a demultiplexer block, a data store block and a non-local goto block in the graphical model.

19. The method of claim 15, wherein the syntactic complexity includes an abstract component and a concrete component.

20. The method of claim 15, wherein the graphical model includes one or more hierarchical levels, and the method further comprising:

assigning one or more comprehensibility scores to the one or more hierarchical levels of the graphical model, wherein the comprehensibility score of the graphical model is based on the one or more comprehensibility scores assigned to the one or more hierarchical levels of the graphical model.

21. The method of claim 15, wherein the action is that the comprehensibility score of the graphical model is indicated in a graphical representation of the graphical model using one or more visual cues, the one or more visual cues including one or more of text, color, shading and texture.

22. One or more non-transitory computer-readable storage media storing one or more instructions, that, when executed by a processor, cause the processor to perform the following:

identifying, using a processing device, an element in an executable graphical model, where the element represents:

one or more entities in the graphical model, or one or more relationships in the graphical model;

determining, using the processing device, a comprehensibility score of the graphical model where the comprehensibility score is:

based on a syntactic complexity of the graphical model, the syntactic complexity including:

a visual complexity created by a presence of the one or more entities in the graphical model, or one or more connections associated with ones of the entities in the graphical model, and a modeling complexity created by a functionality or a data structure of the one or more entities in the graphical model; and outputting via a user interface a visual cue and/or an auditory cue indicative of how one or more of the entities in the executable graphical model affect the comprehensibility score.

23. The one or more non-transitory computer-readable storage media of claim 22, further storing instructions for:

displaying, on a display device, the comprehensibility score of the graphical model.

24. The one or more non-transitory computer-readable storage media of claim 22, further storing instructions for:

determining, using the processing device, the syntactic complexity of the graphical model using one or more syntax rules associated with the graphical model.

25. The one or more non-transitory computer-readable storage media of claim 22, wherein the syntactic complexity depends on a presence of one or more of a block, a function-call subsystem, a sequential logic block, a graphical function, a line, a crossing of lines, a bend of line, a state crossing, a wormhole, a multiplexor block, a demultiplexer block, a data store block and a non-local goto block in the graphical model.

26. The one or more non-transitory computer-readable storage media of claim 22, wherein the syntactic complexity includes an abstract component and a concrete component.

27. The one or more non-transitory computer-readable storage media of claim 22, wherein the graphical model includes one or more hierarchical levels, and the method further comprising:

assigning one or more comprehensibility scores to the one or more hierarchical levels of the graphical model, wherein the comprehensibility score of the graphical model is based on the one or more comprehensibility scores assigned to the one or more hierarchical levels of the graphical model.

28. The one or more non-transitory computer-readable storage media of claim 22, wherein the action is that the comprehensibility score of the graphical model is indicated in a graphical representation of the graphical model using one or more visual cues, the one or more visual cues including one or more of text, color, shading and texture.

29. A computing device, comprising:

storage for storing computer-executable instructions;

a processor for executing the computer-executable instructions to:

identify an element in an executable graphical model, where the element represents:

one or more entities in the executable graphical model, or one or more relationships in the executable graphical model;

determine a comprehensibility score of the executable graphical model where the comprehensibility score is:

based on a syntactic complexity of the executable graphical model, the syntactic complexity including:

a visual complexity created by a presence of the one or more entities in the executable graphical model, or one or more connections associated with ones of the entities in the executable graphical model; and a modeling complexity created by a functionality or a data structure of the one or more entities in the executable graphical model; and receive a request to store the executable graphical model in the storage or to incorporate an element into the executable graphical model in the storage;

based on the comprehensibility score, grant the request by storing the executable graphical model in the storage or by incorporating the element into the executable model in the storage if the comprehensibility score surpasses a comprehensibility score threshold; or deny the request if the comprehensibility score does not surpass the comprehensibility score threshold.

30. A computing device, comprising:

storage for storing computer-executable instructions;

a processor for executing the computer-executable instructions to:

identify an element in an executable graphical model, where the element represents:

one or more entities in the graphical model, or one or more relationships in the executable graphical model;

determine a comprehensibility score of the executable graphical model where the comprehensibility score is:

based on a syntactic complexity of the executable graphical model, the syntactic complexity including:

a visual complexity created by a presence of the one or more entities in the executable graphical model, or one or more connections associated with ones of the entities in the executable graphical model, and a modeling complexity created by a functionality or a data structure of the one or more entities in the executable graphical model; and output via a user interface a visual cue and/or an auditory cue indicative of how one or more of the entities in the executable graphical model affect the comprehensibility score.

* * * * *